(12) United States Patent
Pietrobon et al.

(10) Patent No.: US 10,909,470 B2
(45) Date of Patent: Feb. 2, 2021

(54) METHOD AND APPARATUS FOR PROVIDING SEMANTIC-FREE TRAFFIC PREDICTION

(71) Applicant: HERE Global B.V., Eindhoven (NL)

(72) Inventors: Davide Pietrobon, Berkeley, CA (US); Andrew Lewis, Berkeley, CA (US); Jane MacFarlane, Oakland, CA (US)

(73) Assignee: HERE GLOBAL B.V., Eindhoven (NL)

( * ) Notice: Subject to any disclaimer, the term of this patent is extended or adjusted under 35 U.S.C. 154(b) by 921 days.

(21) Appl. No.: 15/439,622

(22) Filed: Feb. 22, 2017

(65) Prior Publication Data

US 2018/0240026 A1  Aug. 23, 2018

(51) Int. Cl.
*G06N 20/00* (2019.01)
*G08G 1/01* (2006.01)

(52) U.S. Cl.
CPC .......... *G06N 20/00* (2019.01); *G08G 1/0112* (2013.01); *G08G 1/0129* (2013.01); *G08G 1/0133* (2013.01); *G08G 1/0141* (2013.01)

(58) Field of Classification Search
CPC .... G06N 20/00; G08G 1/0112; G08G 1/0129; G08G 1/0133; G08G 1/0141
See application file for complete search history.

(56) References Cited

U.S. PATENT DOCUMENTS 7,755,509 B2   7/2010  Bespalov et al.
8,275,540 B2   9/2012  Downs et al.
8,396,663 B2   3/2013  Tennent et al.
(Continued)

FOREIGN PATENT DOCUMENTS

CN   101694743 A   4/2010

OTHER PUBLICATIONS

Shimizu et al., "Exact Decoding for Jointly Labeling and Chunking Sequences", Proceedings of COLING/ACL 2006 Main Conference Poster Session, pp. 763-770, Sydney, Jul. 2006 (Year: 2006).*
Fabritiis et al., "Traffic Estimation and Prediction Based on Real Time Floating Car Data", Proceedings of the 11th International IEEE, Conference on Intelligent Transportation Systems, Oct. 12-15, 2008, pp. 197-203.
(Continued)

*Primary Examiner* — Robert A Cassity
*Assistant Examiner* — Tsu-Chang Lee
(74) *Attorney, Agent, or Firm* — Ditthavong & Steiner, P.C.

(57) ABSTRACT

An approach is provided for semantic-free traffic prediction. The approach involves dividing a travel-speed data stream into a plurality of travel-speed patterns. The travel-speed data stream represents vehicle travel speeds occurring in a road network. The approach also involves representing each of the plurality of travel-speed patterns by a respective token. The respective token is selected from a dictionary of tokens representing a plurality of travel-speed templates determined from historical travel-speed data. The approach further involves matching a sequence of the respective tokens corresponding to said each of the plurality of travel-speed patterns to a best-fit sequence of tokens determined from the historical travel-speed data. The approach further involves determining a predicted sequence of tokens based on the best-fit sequence of tokens, and generating a traffic prediction for the road network based on the predicted sequence of tokens.

15 Claims, 14 Drawing Sheets

(56) References Cited

U.S. PATENT DOCUMENTS

| | | | |
|---|---|---|---|
| 8,666,930 B2* | 3/2014 | Kim | G06F 16/90344 |
| | | | 706/62 |
| 2013/0110392 A1* | 5/2013 | Kosseifi | G01C 21/3415 |
| | | | 701/410 |
| 2015/0127245 A1 | 5/2015 | Jang et al. | |

OTHER PUBLICATIONS

Horvitz, "Predictive Analytics for Traffic", Microsoft Research, Sep. 26, 2011, 7 Pages.

* cited by examiner

METHOD AND APPARATUS FOR PROVIDING SEMANTIC-FREE TRAFFIC PREDICTION

BACKGROUND

Mapping-related service providers (e.g., map data providers, navigation service providers, etc.) face significant technical challenges when making future traffic predictions for a given road network. Historically, such traffic predictions generally rely on historical traffic data that are tagged with detailed knowledge of significant events that might be impacting traffic patterns on a road link of interest. This detailed knowledge (e.g., whether there is a holiday, confirmed accident, etc. on the roadway) is referred to as the semantics of the events. However, information about the semantics of the events often can be missing because significant resources often are needed to determine and correlate the semantics with the historical data. As a result, service providers are challenged to develop representations of traffic or probe data from which traffic predictions can be made without semantics.

SOME EXAMPLE EMBODIMENTS

Therefore, there is a need for an approach for providing semantic-free traffic prediction.

According to one embodiment, a method for predicting traffic from travel-speed data using tokenized travel-speed patterns comprises dividing a travel-speed data stream into a plurality of travel-speed patterns. The travel-speed data stream represents vehicle travel speeds occurring in a road network. The method also comprises representing each of the plurality of travel-speed patterns by a respective token. The respective token is selected from a dictionary of tokens representing a plurality of travel-speed templates determined from historical travel-speed data. The method further comprises matching a sequence of the respective tokens corresponding to said each of the plurality of travel-speed patterns to a best-fit sequence of tokens determined from the historical travel-speed data. The method further comprises determining a predicted sequence of tokens based on the best-fit sequence of tokens. The method further comprises generating a traffic prediction for the road network based on the predicted sequence of tokens.

According to another embodiment, an apparatus for predicting traffic from travel-speed data using tokenized travel-speed patterns comprises at least one processor, and at least one memory including computer program code for one or more computer programs, the at least one memory and the computer program code configured to, with the at least one processor, cause, at least in part, the apparatus to divide a travel-speed data stream into a plurality of travel-speed patterns. The travel-speed data stream represents vehicle travel speeds occurring in a road network. The apparatus is further caused to represent each of the plurality of travel-speed patterns by a respective token. The respective token is selected from a dictionary of tokens representing a plurality of travel-speed templates determined from historical travel-speed data. The apparatus is further caused to match a sequence of the respective tokens corresponding to said each of the plurality of travel-speed patterns to a best-fit sequence of tokens determined from the historical travel-speed data. The apparatus is caused to determine a predicted sequence of tokens based on the best-fit sequence of tokens. The apparatus is further caused to generate a traffic prediction for the road network based on the predicted sequence of tokens.

According to another embodiment, a computer-readable storage medium for predicting traffic from travel-speed data using tokenized travel-speed patterns carries one or more sequences of one or more instructions which, when executed by one or more processors, cause, at least in part, an apparatus to divide a travel-speed data stream into a plurality of travel-speed patterns. The travel-speed data stream represents vehicle travel speeds occurring in a road network. The apparatus is further caused to represent each of the plurality of travel-speed patterns by a respective token. The respective token is selected from a dictionary of tokens representing a plurality of travel-speed templates determined from historical travel-speed data. The apparatus is further caused to match a sequence of the respective tokens corresponding to said each of the plurality of travel-speed patterns to a best-fit sequence of tokens determined from the historical travel-speed data. The apparatus is caused to determine a predicted sequence of tokens based on the best-fit sequence of tokens. The apparatus is further caused to generate a traffic prediction for the road network based on the predicted sequence of tokens.

According to another embodiment, an apparatus for predicting traffic from travel-speed data using tokenized travel-speed patterns comprises means for dividing a travel-speed data stream into a plurality of travel-speed patterns. The travel-speed data stream represents vehicle travel speeds occurring in a road network. The apparatus also comprises means for representing each of the plurality of travel-speed patterns by a respective token. The respective token is selected from a dictionary of tokens representing a plurality of travel-speed templates determined from historical travel-speed data. The apparatus further comprises means for matching a sequence of the respective tokens corresponding to said each of the plurality of travel-speed patterns to a best-fit sequence of tokens determined from the historical travel-speed data. The apparatus further comprises means for determining a predicted sequence of tokens based on the best-fit sequence of tokens. The apparatus further comprises means for generating a traffic prediction for the road network based on the predicted sequence of tokens.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 2C is a diagram illustrating a token list representing a travel-speed data stream, according to one embodiment;

DESCRIPTION OF SOME EMBODIMENTS

Examples of a method, apparatus, and computer program for providing semantic-free traffic prediction are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
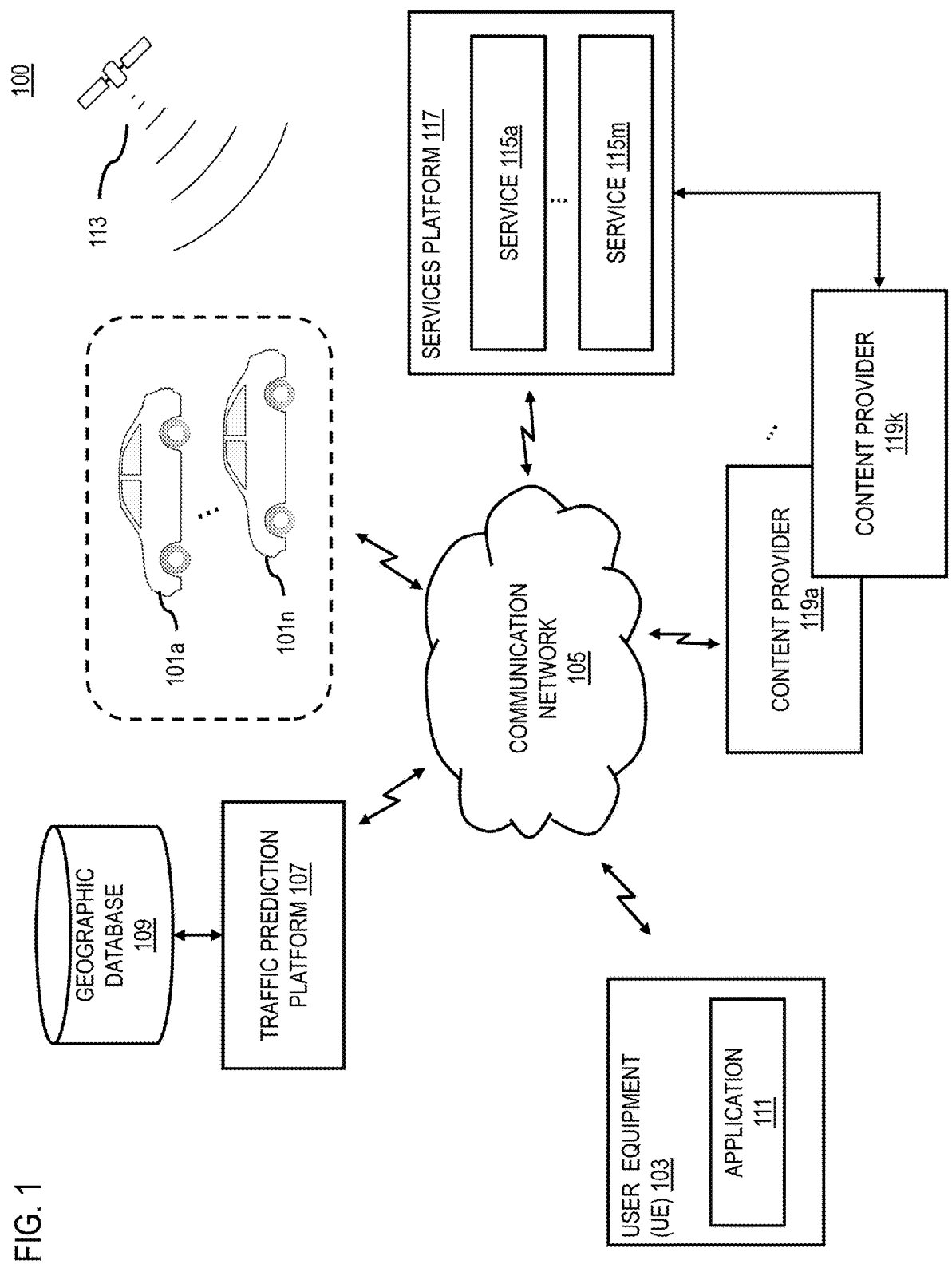
FIG. 1 is a diagram of a system capable of providing semantic-free traffic prediction, according to one embodiment.

FIG. 1 is a diagram of a system capable of providing semantic-free traffic prediction, according to one embodiment. Many current approaches to modeling traffic use a historical modeling process. For example, for each link or road segment in a road network, years of data (e.g., travel speed data) are accumulated and processed to create a typical traffic profile for a given day, e.g., Monday speed profiles that include, for instance, rush hour peaks and free flow periods. Typically, these profiles are stored in a database and accessed for creating a traffic state. The traffic state can be determined using real-time data that is collected on a particular link or road segment in combination with the created historical profiles. In one example, if the link has no data due to lack of probe penetration or available travel speed data then the historical profile for that day and that time is inserted in order to fill out the traffic map. In another example, if real-time data is available but sparse then a blend of the historical data in the profiles and the real-time data is created to determine the current traffic state.

However, these simple historical profiles often had to be adjusted to handle significant or unexpected events, e.g., holidays or accidents. Otherwise, significant or unexpected events could result in traffic profiles that are significantly different than what is predicted by the unadjusted historical profile. For example, under a traditional approach, if a holiday (e.g., July 4$^{th}$) occurred on a Wednesday and resulted in significant reductions in traffic, the traffic model would still show a Wednesday traffic congestion profile which would not be representative of the actual reduced traffic state. To adjust for this holiday, a traditional traffic prediction system would be required to have embedded knowledge of every holiday (e.g., semantics of the holidays) that might impact traffic and have specific patterns to substitute based on the holiday that is occurring. To further complicate this traditional approach, a July 4$^{th}$ holiday falling on Friday can have very different traffic effects that July 4$^{th}$ holiday falling on a Wednesday. Therefore, traditional approaches are dependent on knowing the semantics of a phenomenon or event. Examples of the type of semantics that might be needed by traditional approaches include, but are not limited to: day of week, time of day, holiday, seasonality, weather, incidents, etc. Because there can be many different permutations of these different types of semantics, traditional approaches generally require building models for each situation or permutation, and rules for choosing among them. Further, because the semantics of each possible event and/or permutation of the event must be determined and encoded into the system to generate adjusted profiles, traditional approaches to traffic prediction are not readily scalable as the number of road links, events, event conditions, and associated semantic increases.

To address this problem, a system 100 of FIG. 1 introduces the capability to generate a tokenized representation of travel-speed patterns derived from travel speed data (e.g., probe data, road speed sensor data, etc.) to apply a grammar-based predictive model. In one embodiment, the tokenized representation and grammar-based predictive model enables the system 100 to create a dictionary of token sequences or patterns (e.g., representing observed or predicted travel-speed patterns) from historical travel-speed data. The system 100 can then choose among the historical token sequences to make a traffic prediction based on similarity to recent history. The tokenized representation of travel-speed patterns (e.g., patterns representing observed or predicted travel speed versus time for a period of time) advantageously enables the system 100 to more efficiently process and evaluate real-time probe data for similarity to historical tokens sequences (e.g., representing historical travel-speed patterns) without reference to the semantics of any phenomenon or event that might be impacting the travel speeds in a road network.

To enable this tokenized representation and grammar-based predictive model, the system 100, for instance, splits up speed curves (e.g., probe data, road speed sensor data, etc.) into smaller pieces (e.g., time scale can vary from minutes to days to weeks). In one embodiment, the system 100 can avoid splitting the travel-speed data or speed curves during interesting traffic phenomena (e.g., if detected). The system 100 then clusters the smaller pieces into dictionary as travel-speed templates or patterns with each template or pattern represented by a token (e.g., a letter, number, symbol, etc.). In this way, the system 100 can write speed history as a sequence of tokens from the dictionary. In one embodiment, once the speed history is written, the system 100 can look back over a variable amount of that speed history to make a traffic prediction. For example, if recent history is unusual, then a prediction based on the tokens from that recent history is already uniquely determined (e.g., when the tokenized recent history results in only one predicted future traffic state). However, if there are multiple future traffic states that are possible from the tokenized recent history, then the system 100 can look farther back into the speed history until a unique or unambiguous traffic prediction is determined. In addition or alternatively, the system 100 can use any other criteria (e.g., a stopping criterion) for determining how far back into the speed history to evaluate. For instance, the system 100 can use a stopping criterion such as: "look back up to N tokens and then perform a weighted average of the speed profiles or patterns corresponding to the predicted tokens (if more than one)."

Figure 2A:
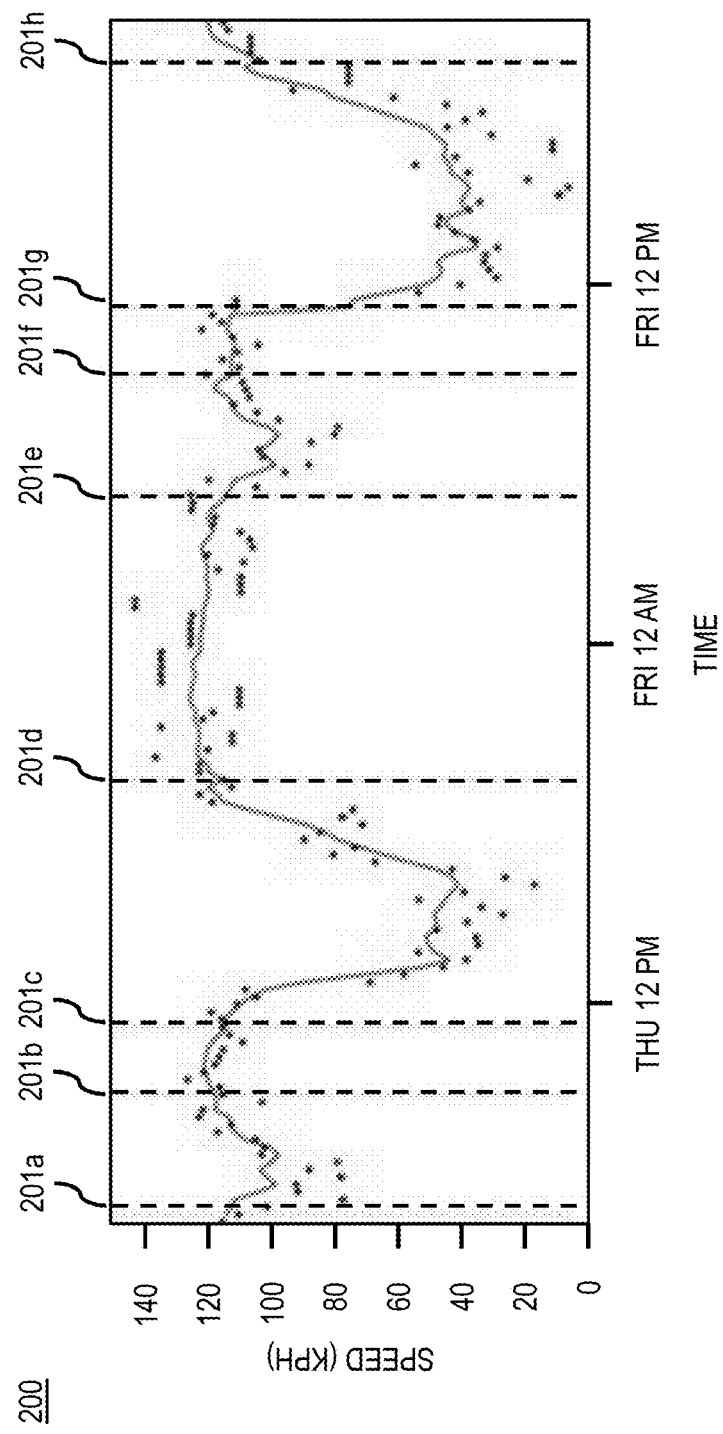
FIG. 2A is a diagram illustrating a process for dividing example travel-speed data into travel-speed patterns, according to one embodiment.
Figure 2B:
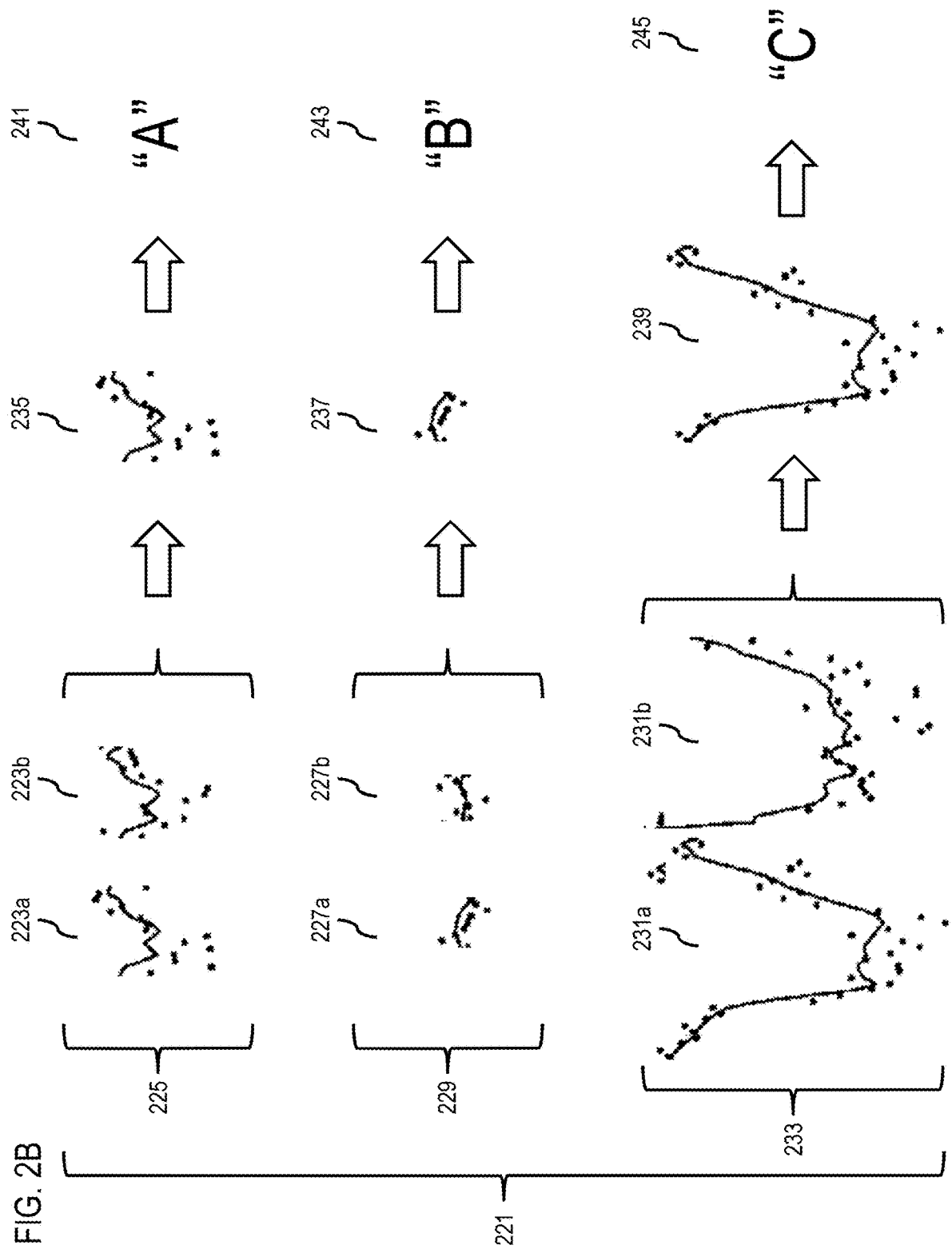
FIG. 2B is diagram illustrating a process for tokenization of travel-speed patterns, according to one embodiment.

In one embodiment, historical speeds (e.g., recorded in historical probe data, historical road speed sensor data, etc.) are divided into travel patterns as shown in FIG. 2A. For example, FIG. 2A illustrates a graph 200 that plots historical travel-speed data according to travel speed versus time. In one embodiment, natural points of division 201a-201h (also collectively referred to as division points 201) are when the speed of a vehicle or device traveling in a road network (e.g., a probe or set of probes) transitions from free-flow to congestion, or vice-versa. In addition or alternatively, the system 100 can use criteria other than speed transition points to split historical travel-speed data. For example, the historical speeds can be divided at fixed times of day or any arbitrary time of day so that the points of division 201 correspond to these times rather than to speed transition points. In this way, the resulting speed patterns can have more uniform lengths to facilitate clustering and tokenization as discussed with respect to the various embodiments described herein. In one embodiment, the portions of the speed curve falling between two adjacent division points 201 represents a potential pattern. Accordingly, different patterns can have different lengths depending on when the speed crosses the threshold from free-flow to congestion and vice versa, or when the fixed or arbitrary times of days are specified. Typical patterns usually have lengths of a few hours, but the length can vary from minutes to days or more depending on the variability of traffic on a given road link. In one embodiment, the same set of historical travel-speed data can be divided according to different criteria or time scales to create different sets of travel-speed patterns that reflect different time scales (e.g., different time lengths). In this way, the different time scales can be used to capture traffic events or phenomena that may have patterns at different levels of granularity. In one embodiment, as shown in FIG. 2B, a dictionary 221 of tokenized patterns is created by clustering similar patterns extracted from the graph 200 of FIG. 2A into respective clusters (e.g., patterns 223a and 223b into a cluster 225, patterns 227a and 227b into a cluster 229, and patterns 231a and 231b into a cluster 233). For each cluster 225, 229, and 233, the system 100 designates a summary of the respective cluster properties (e.g., the average of each cluster, a representative example pattern selected from each cluster, etc.) as respective travel-speed templates 235-239 to represent each cluster. Each travel-speed template 235-239 is assigned or otherwise designated with a respective token 241-245 (e.g., "A", "B", and "C"), which are recorded in the dictionary 221. Although the various embodiments described herein use letters as the tokens, it is contemplated that any combination of letters, numbers, symbols, and/or other representations can be used as a token. In one embodiment, if the historical travel-speed data is divided at different time scales, then the system 100 can also create multiple dictionaries which could span different and/or complementary time scales. The system 100 can use each of the multiple dictionaries independently or combine them into a singled unified dictionary.

Figure 2C:
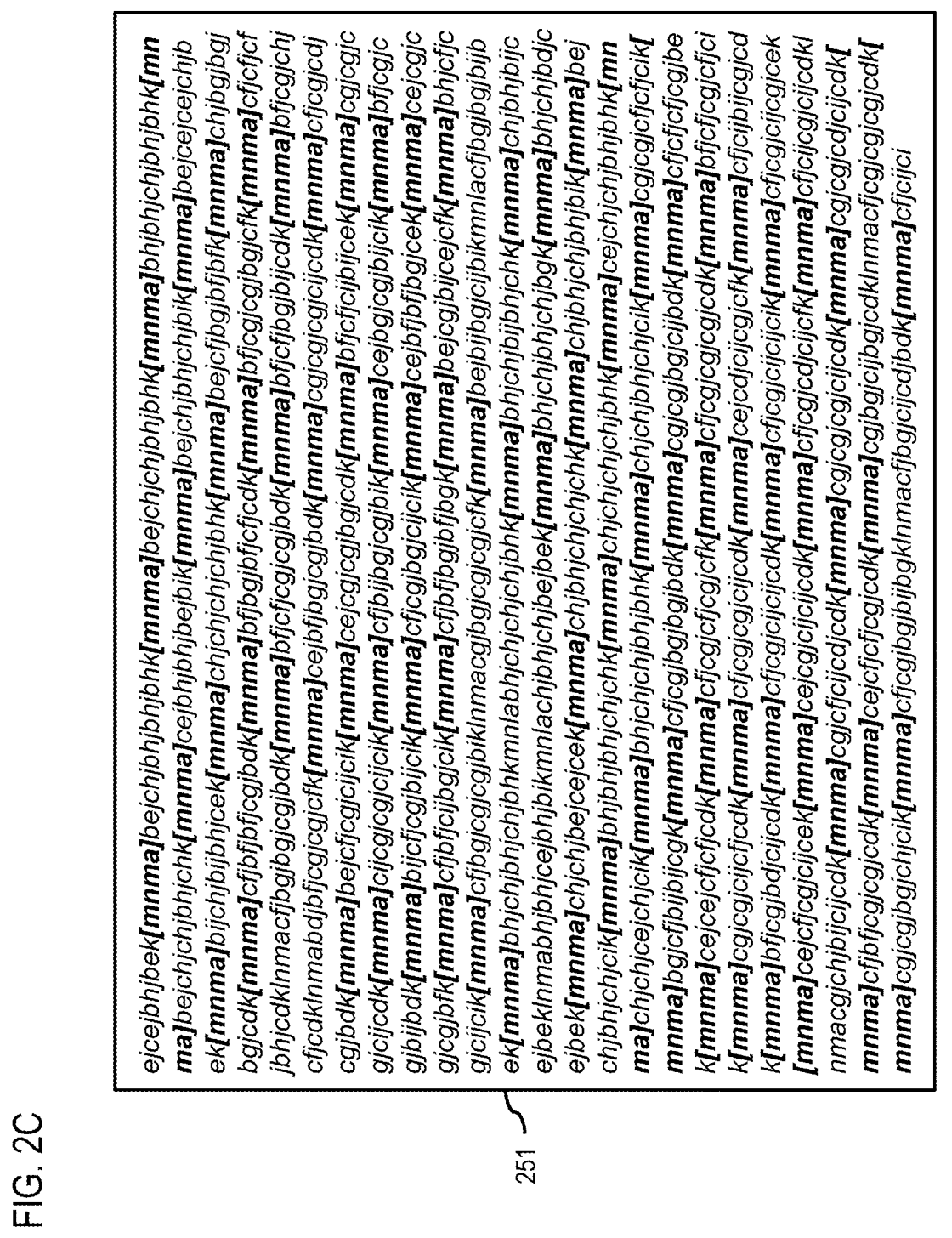

In this way, all past speed history can be written as a sequence of the templates or tokens of the dictionary 221 as shown in FIG. 2C. In the example of FIG. 2C, the token list 251 is generated by dividing a travel-speed data stream into individual patterns and then matching those patterns against the templates and/or tokens stored in the dictionary 221. Each matching token is then added sequentially to the token list 251. In one embodiment, non-matching portions of the data stream can be processed to determine whether those portions should be added to the dictionary as new templates or tokens. Otherwise, those portions of the data stream can remain untokenized and not represented in the token list 251. In yet another embodiment, regular expressions (e.g., combinations of tokens) can be identified in the token list 251 (e.g., the sequence of tokens "mnma" as bracketed and highlighted from emphasis in the token list 251 as shown in FIG. 2C). These regular expressions or sequence of tokens, for instance, represent "words" within the dictionary that can occur in observed data streams.

In one embodiment, these regular expressions or words can be used during the prediction phase. For example, observing "mnm" in a live data stream can lead to a prediction that "a" should appear next because of the common or regular appearance of the combination of "mnma" in historical probe data. Accordingly, the system 100 can predict that the travel-speed pattern or template associated in the dictionary 221 with the token "a" is likely to occur next in the live data stream. In other words, future speeds can be predicted by looking at a recent history of probe or travel speed data, and matching the best-fit sequence of historical token patterns.

Figure 2D:
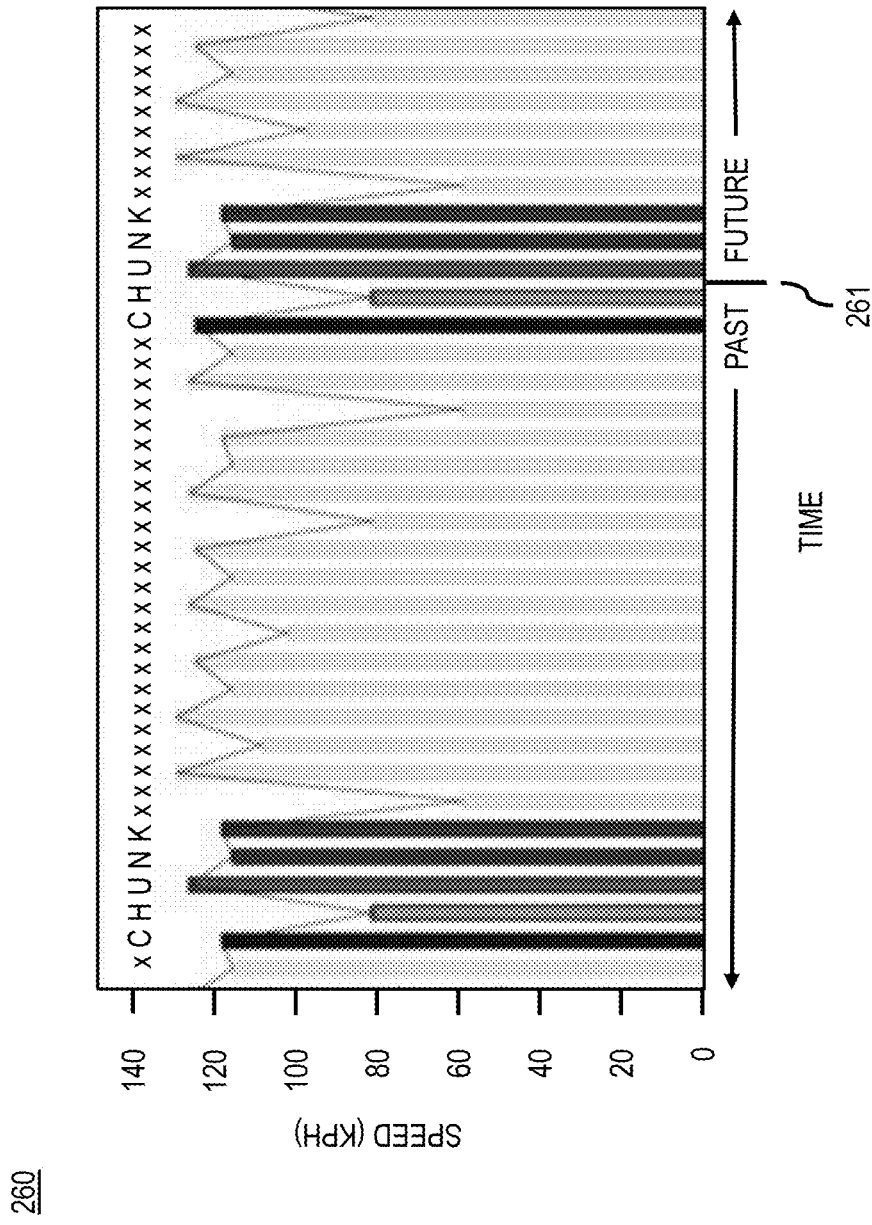
FIG. 2D is a diagram illustrating a process for predicting future traffic patterns based on tokenized travel-speed data, according to one embodiment.

One example of this prediction process is illustrated in FIG. 2D. As shown, the graph 260 of FIG. 2D plots a stream of live travel-speed data (e.g., live probe data or live road speed sensor data) according to speed versus time. The point 261 designates the current time which delineates the past token sequences from predicted future token sequences. In this example the most recent past tokens determined from the live data stream are the tokens "C" and "H". In one embodiment, to match the tokens "C" and "H" to the live data, the system 100 performs a best fit analysis of each pattern extracted from the live data against templates stored in the token dictionary 221. By way of example, the best fit can be performed using a least squares analysis or other pattern matching algorithm. In this case the two most recent patterns correspond to "C" and "H". The system 100 then matches the sequence to two tokens against known historical sequences. In this example, the "CH" matches the beginning of a known sequence "CHUNK". Accordingly, the system 100 predicts that the future traffic patterns is expected to correspond to the travel-speed templates or patterns associated with the token sequence "UNK".

As illustrated in the embodiments discussed above, the embodiments of the system 100 advantageously creates a traffic prediction model that can react to a wide variety of different phenomena or events (e.g., usually weekly commute patterns, holidays, weather events, accidents, etc.) without needing to specifically encode the semantics of those phenomena or events. In other words, the system 100 can identify and react to "something-we-have-seen-before-on-this-link" without necessarily categorizing it as an "accident" or a "holiday" by capturing and representing the "something-we-have-seen-before-on-this-link" as a sequence of tokens that can be more easily and rapidly by automated computer means.

In one embodiment, different traffic phenomena or events may have durations on very different time scales. The system 100 automatically adapts to these different scales because each extracted pattern has a length that is delineated by speed transitions (e.g., transitioning from free-flow to congestion or vice-versa). As a result, if a phenomenon lasts a week because no speed transition is detected or observed in less than a week's time, the pattern itself will be reflect the time scale. Similarly, if a phenomenon causes speed transitions to occur within minutes, then the resulting patterns also could be on the minute time scale. Because the speed transitions can be detected without knowing the semantics of the phenomenon, the resulting predictive model can also be semantic free. For example, correctly recognizing that a given day looks like a holiday pattern, or (if the system 100 is truly semantic-free) even matching to the correct day of the week, might require looking at probe data collected back several days, which also means using templates that are up to a week or more long. On the other hand, in the event of a sudden slowdown at an unusual time (e.g., an accident, weather event, etc.), the system 100 can make short-term predictions based only on the recent unusual event, without being influenced by how good a match traffic was several days earlier. Accordingly, in one embodiment, depending on whether a short-term or long-term prediction is wanted, the system 100 can apply different templates of varying lengths or timescales over the same travel-speed data. As noted above, the system 100 can also use multiple different and/or complementary time scales to analyze the travel-speed data and generate a traffic prediction. In this way, the resulting traffic prediction can also be made at different timescales, e.g., to reflect phenomena or events that may occur at different timescales.

In one embodiment, when using the system 100 for real-time traffic prediction, the system 100 can look at the recent history of travel-speed data, written as a sequence of templates or tokens, and compare the sequence to what has been observed or recorded by the system 100 in the past, also written as a sequence of templates or tokens. As previously discussed, in some cases, the very recent past might be enough by itself to unambiguously predict the short-term future. In other cases, the system 100 may need to evaluate farther back in the recorded sequence of tokens representing a recorded data stream in order to make an unambiguous prediction. Thus, how much of the prior interval of travel-speed data to evaluate can vary dynamically based on both past history and how far into the future the system 100 is to predict traffic conditions. In addition, because each pattern has a length that varies based on speed transition points or times of day, the prior interval to evaluate also varies accordingly depending on when those speed transitions or times of day occur to define a pattern.

In one embodiment, by tokenizing the travel-speed patterns occurring in travel-speed data, the system 100 can use natural language processing algorithms on traffic pattern data. In other words, the tokenization of traffic patterns can use any known algorithm for predicting what the next word in a sentence will be based on various N-tuples of the words that have come before. In effect, in one embodiment, the tokenization processes used by the system 100 reduces traffic prediction to the problem of predicting the next token in a stream. Accordingly, in addition to natural language processing, the system 100 can apply any known algorithm for predicting a next item in a sequence, such as techniques used in genome sequencing or other types of finite state stochastic systems analysis, to traffic prediction.

Returning to FIG. 1, in one embodiment, the system 100 comprises one or more vehicles 101a-101n (also collectively referred to as vehicles 101) and/or one or more user equipment devices (UEs) 103 that act as probes traveling over a road network. Although the vehicles 101 are depicted as automobiles, it is contemplated that the vehicles 101 can be any type of transportation vehicle manned or unmanned (e.g., planes, aerial drone vehicles, motor cycles, boats, bicycles, etc.), and the UEs 103 can be associated with any of the types of vehicles or a person or thing traveling within the bounded geographic area (e.g., a pedestrian). In one embodiment, each vehicle 101 and/or UE 103 is assigned a unique probe identifier (probe ID) for use in reporting or transmitting probe data collected by the vehicles 101 and UEs 103. The vehicles 101 and UEs 103, for instance, are part of a probe-based system for collecting probe data for measuring traffic conditions in a road network. In one embodiment, each vehicle 101 and/or UE 103 is configured to report probe data as probe points, which are individual data records collected at a point in time that records telemetry data for that point in time.

In one embodiment, a probe point can include attributes such as: (1) probe ID, (2) longitude, (3) latitude, (4) heading, (5) speed, and (6) time. The list of attributes is provided by way of illustration and not limitation. Accordingly, it is contemplated that any combination of these attributes or other attributes may be recorded as a probe point. For example, attributes such as altitude (e.g., for flight capable vehicles or for tracking non-flight vehicles in the altitude domain), tilt, steering angle, wiper activation, etc. can be included and reported for a probe point. In one embodiment, the vehicles 101 may include sensors for reporting measuring and/or reporting attributes. The attributes can also be any attribute normally collected by an on-board diagnostic (OBD) system of the vehicle, and available through an interface to the OBD system (e.g., OBD II interface or other similar interface).

The probe points can be reported from the vehicles 101 and/or UEs 103 in real-time, in batches, continuously, or at any other frequency requested by the system 100 over, for instance, the communication network 105 for processing by a traffic prediction platform 107. The probe points also can be mapped to specific road links stored in the geographic database 109. In one embodiment, the system 100 (e.g., via the traffic prediction platform 107) can generate probe traces from the probe points for an individual probe so that the probe traces represent a travel trajectory of the probe through the road network. The travel trajectory can then be used to determine the travel-speed curves, patterns, templates, etc. discussed with respect to the various embodiments described herein.

In one embodiment, the travel-speed data can be provided by one or more speed sensors operating in the road network. For example, the road network may be equipped with sensors including, but not limited to, fixed inductive loop sensors, cameras, radar, and/or other remoting sensing devices capable of determining travel speeds of vehicles, devices, etc. traveling in the road network. In one embodiment, the sensors can be part of a road monitoring infrastructure that reports travel-speed and other telemetry data (e.g., location, heading, vehicle type, vehicle ID, etc.) to the traffic prediction platform 107 or other monitoring center, in real-time, continuously, in batches, on demand, according to a schedule, etc.

In one embodiment, the traffic prediction platform 107 performs the processes for providing semantic-free traffic prediction as discussed with respect to the various embodiments described herein. In one embodiment, the traffic prediction platform 107 can be a standalone server or a component of another device with connectivity to the communication network 105. For example, the component can be part of an edge computing network where remote computing devices (not shown) are installed along or within proximity of a road network to provide semantic-free traffic prediction from travel-speed data collected locally or within a local area served by the remote or edge computing device.

In one embodiment, the traffic prediction platform 107 has connectivity or access to a geographic database 109 that includes mapping data about a road network (additional description of the geographic database 109 is provided below with respect to FIG. 2). In one embodiment, the token dictionary, the travel-speed data (e.g., live and/or historical probe or road speed sensor data data), the tokenized travel-speed data, historical token sequences, or a combination thereof can also be stored in the geographic database 109 by the traffic prediction platform 107. In addition or alternatively, the travel-speed data can be stored by another component of the system 100 in the geographic database 109 for subsequent retrieval and processing by the traffic prediction platform 107.

In one embodiment, the vehicles 101 and/or UEs 103 may execute an application 111 to present or use the semantic-free traffic prediction generated by the traffic prediction platform 107. For example, if the application 111 is a navigation application then the semantic-free traffic predictions can be used to determine routing information, provide updated estimated times of arrival (ETAs), provide notifications of predicted traffic phenomena or events, provide notifications of potentially problematic areas/intersections/interchanges, and the like.

By way of example, the UE 103 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 103 can support any type of interface to the user (such as "wearable" circuitry, etc.). In one embodiment, the UE 103 may be associated with a vehicle 101 (e.g., cars), a component part of the vehicle 101, a mobile device (e.g., phone), and/or a combination of thereof. Similarly, the vehicle 101 may include computing components that can be perform all or a portion of the functions of the UE 103.

By way of example, the application 111 may be any type of application that is executable at the vehicle 101 and/or the UE 103, such as mapping application, location-based service applications, navigation applications, content provisioning services, camera/imaging application, media player applications, social networking applications, calendar applications, and the like. In one embodiment, the application 111 may act as a client for the traffic prediction platform 107 and perform one or more functions of the traffic prediction platform 107 alone or in combination with the platform 107.

In one embodiment, the vehicles 101 and/or the UEs 103 are configured with various sensors for generating probe data. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture obstruction for analysis and documentation purposes), an audio recorder for gathering audio data, velocity sensors mounted on steering wheels of the vehicles, switch sensors for determining whether one or more vehicle switches are engaged, and the like.

In another embodiment, the sensors of the vehicles 101 and/or UEs 103 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the vehicle may detect the relative distance of the vehicle from lane or roadways, the presence of other vehicles, pedestrians, traffic lights, potholes and any other objects, or a combination thereof. In one scenario, the sensors may detect weather data, traffic information, or a combination thereof. In one example embodiment, the vehicles 101 and/or UEs 103 may include GPS receivers to obtain geographic coordinates from satellites 113 for determining current location and time associated with the vehicle 101 and/or UE 103 for generating probe data. Further, the location can be determined by a triangulation system such as A-GPS, Cell of Origin, or other location extrapolation technologies.

The communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the traffic prediction platform 107 may be a platform with multiple interconnected components. The traffic prediction platform 107 may include multiple servers, intelligent networking devices, computing devices, components and corresponding software for providing trajectory bundles for map data analysis. In addition, it is noted that the traffic prediction platform 107 may be a separate entity of the system 100, a part of the one or more services 115a-115m (collectively referred to as services 115) of the services platform 117, or included within the UE 103 (e.g., as part of the applications 111).

The services platform 117 may include any type of service 115. By way of example, the services 115 may include mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services platform 117 may interact with the traffic prediction platform 107, the UE 103, and/or the content provider 119 to provide the services 115.

In one embodiment, the content providers 119a-119k (collectively referred to as content providers 119) may provide content or data to the vehicles 101 and/or UEs 103, the traffic prediction platform 107, and/or the services 115. The content provided may be any type of content, such as textual content, audio content, video content, image content, etc. In one embodiment, the content providers 119 may provide content that may aid in making semantic-free traffic predictions from travel-speed data. In one embodiment, the content providers 119 may also store content associated with the vehicles 101, the UE 103, the traffic prediction platform 107, and/or the services 115. In another embodiment, the content providers 119 may manage access to a central repository of data, and offer a consistent, standard interface to data, such as a repository of probe data, speed limit for one or more road links, speed information for at least one vehicle, traffic jam threshold for at least one road link, other traffic information, etc. Any known or still developing methods, techniques or processes for retrieving and/or accessing features for road links from one or more sources may be employed by the traffic prediction platform 107.

By way of example, the vehicles 101, the UEs 103, the traffic prediction platform 107, the services platform 117, and the content providers 119 communicate with each other and other components of the system 100 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 3:
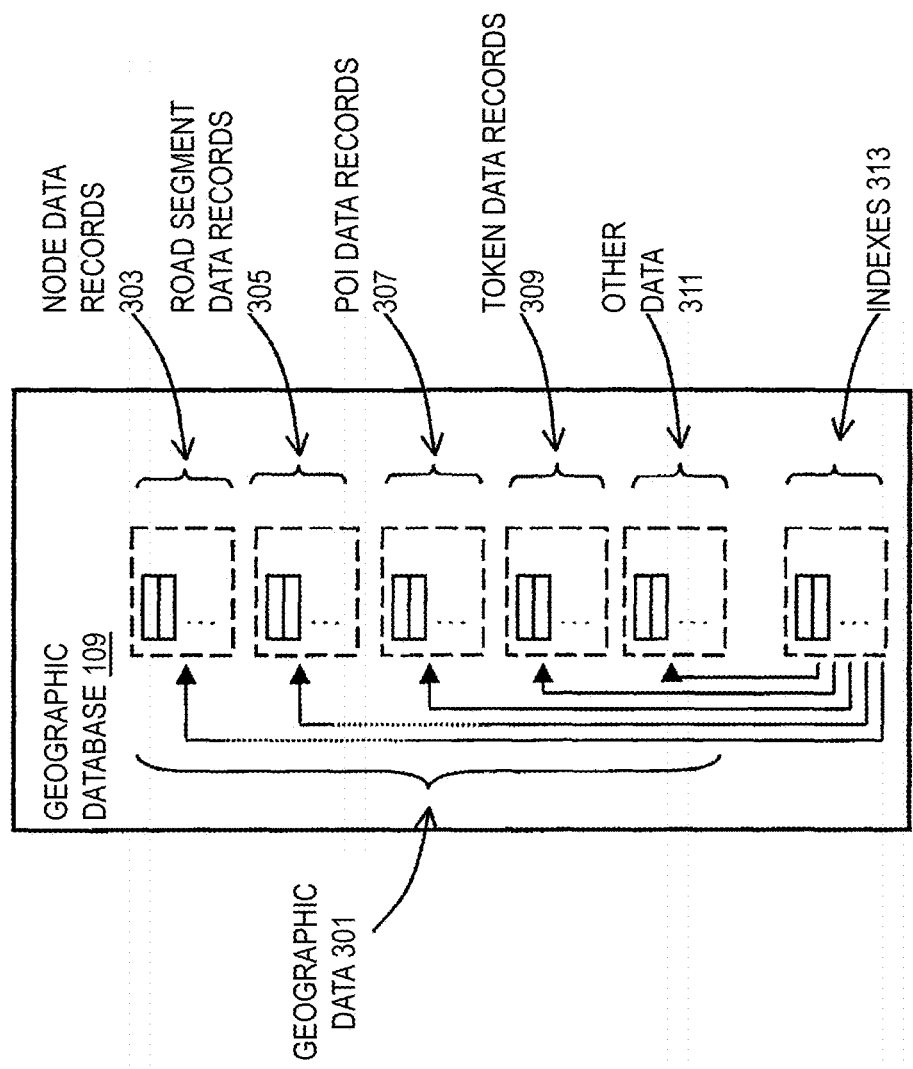
FIG. 3 is a diagram of a geographic database, according to one embodiment.

FIG. 3 is a diagram of the geographic database 109 of system 100, according to exemplary embodiments. In the exemplary embodiments, travel-speed patterns, travel-speed templates, tokens, tokens sequences, historical travel-speed data, and/or any other data used by the system 100 as described in the various embodiments can be stored, associated with, and/or linked to the geographic database 109 or data thereof. In one embodiment, the geographic database 109 includes geographic data 301 used for (or configured to be compiled to be used for) mapping and/or navigation-related services, such as for personalized route determination, according to exemplary embodiments. For example, the geographic database 109 includes node data records 303, road segment or link data records 305, POI data records 307, token data records 309, other data records 311, and/or indexes 313, for example. More, fewer or different data records can be provided.

In one embodiment, the node data records 303 and the road link data records 305 represent a road network, such as used by vehicles, cars, and/or other entities. In other words, the nodes and links of the data records 303 and 305 comprise a system for representing the geospatial characteristics of a transportation in which the nodes represent various location points (e.g., latitude and longitude) of the network and the links represent an extent of a road or path between the nodes. Generally, the nodes are located at intersections points of the road network to minimize the number of nodes needed to represent a transportation network. However, in some embodiments, a node can also fall at a non-intersection point. In this case, the node at the non-intersection can be a shape node which can be used to indicate or more closely follow a road or path with a more complex shape. Alternatively, the geographic database 301 can contain path segment and node data records or other data that represent pedestrian paths or areas in addition to or instead of the vehicle road record data, for example.

The road link and nodes can be associated with attributes, such as a functional class, a road density or link length, a speed attribute (e.g., speed limit along a link, a free-flow speed of traffic along a link, and/or any other indication of an expected speed of travel along the link), parking availability information, geographic coordinates, street names, address ranges, turn restrictions at intersections, and other navigation related attributes, as well as POIs, such as traffic controls (e.g., stoplights, stop signs, crossings, etc.), gasoline stations, hotels, restaurants, museums, stadiums, offices, automobile dealerships, auto repair shops, buildings, stores, parks, etc. As indicated above, the geographic database 109 can include data about the POIs and their respective locations in the POI data records 307. The geographic database 109 can also include data about places, such as cities, towns, or other communities, and other geographic features, such as bodies of water, mountain ranges, etc. Such place or feature data can be part of the POI data or can be associated with POIs or POI data records 307 (such as a data point used for displaying or representing a position of a city).

In one embodiment, the geographic database 109 also includes token data records 309 for storing information about the tokenized representation of travel-speed data collected with respect to the links or road segments stored in the geographic database 109. For example, the token data records 309 may store one or more dictionaries of tokens representing travel-speed patterns or templates determined from travel-speed data collected from probes traversing the road network or from road speed sensors operating in the road network represented in the geographic database 109. In one embodiment, it contemplated that a token dictionary can be generated for and/or applicable to all links stored in the geographic database, a subset of the links, or individual links. In other words, the dictionary can be generated at different levels of granularity within a road network. In one embodiment, the granularity can be based on the attributes of links (e.g., a functional class, etc.). For example, a dictionary can be generated to represent travel-speed patterns or templates observed in a particular functional class (e.g., arterial roadways). The resulting dictionary can then be used for representing and predicting traffic conditions for that particular functional class. Similarly, dictionaries can be specific to an individual link so that different links can have different applicable dictionaries. In yet another embodiment, the token data records 309 also store historical sequences of observed tokens and/or related travel-speed data streams matched to specific links, areas, regions, etc. of the road network represented in the geographic database 109. The system 100 can then query for this historical data to provide semantic-free traffic prediction.

In one embodiment, the other data records 211 include cartographic ("carto") data records, routing data, and maneuver data, which can facilitate generating routing and/or navigation information for end user devices. In one embodiment, the indexes 313 may improve the speed of data retrieval operations in the geographic database 301. For example, the indexes 313 may be used to quickly locate data without having to search every row in the geographic database 301 every time it is accessed.

The geographic database 109 can be maintained by the content provider 119 in association with the services platform 117 (e.g., a map developer). The map developer can collect geographic data to generate and enhance the geographic database 109. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 109 can be a master geographic database stored in a format that facilitates updating, maintenance, and development. For example, the master geographic database 109 or data in the master geographic database 109 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 103, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 109 can be a master geographic database, but in alternate embodiments, the geographic database 109 can represent a compiled navigation database that can be used in or with end user devices (e.g., vehicle 101, UE 103, etc.) to provide navigation-related functions. For example, the geographic database 109 can be used with the end user device to provide an end user with navigation features. In such a case, the geographic database 109 can be downloaded or stored on the end user device (e.g., vehicle 101, UE 103, etc.), such as in application 111, or the end user device can access the geographic database 109 through a wireless or wired connection (such as via a server and/or the communication network 105), for example.

In one embodiment, the end user device can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device (e.g., UE 103) can be a cellular telephone. An end user can use the device navigation functions such as guidance and map display, for example, and for determination of route information to at least one identified point of interest, according to exemplary embodiments.

Figure 4:
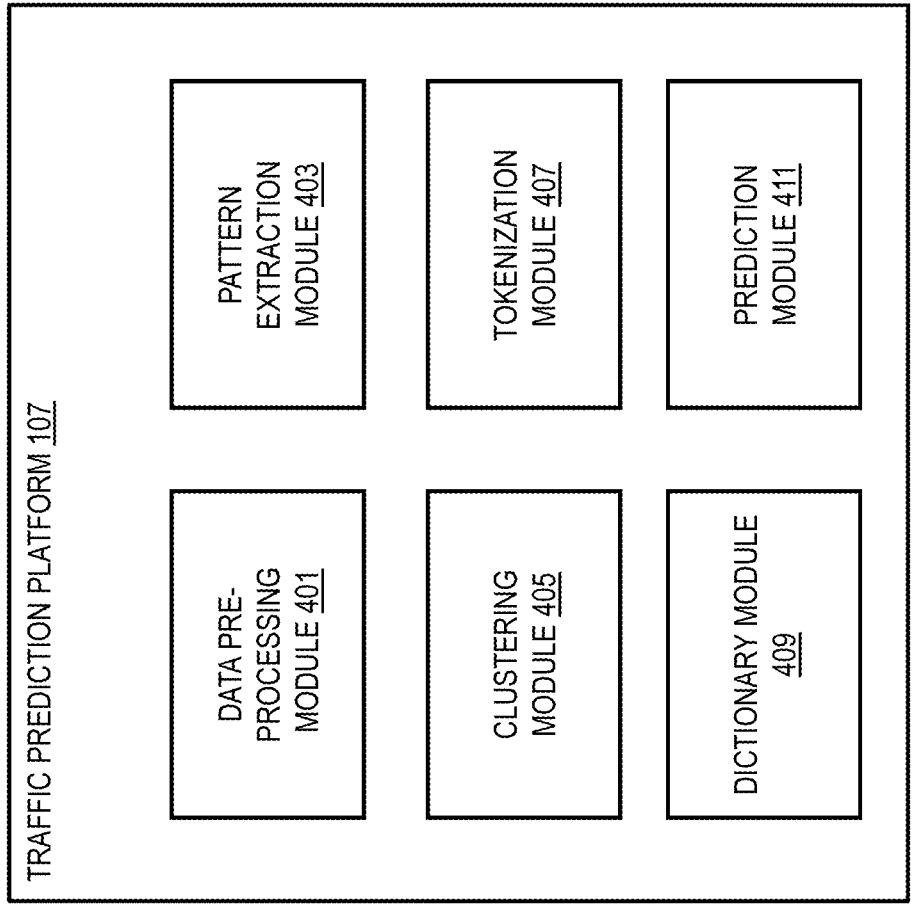
FIG. 4 is a diagram of the components of a traffic prediction platform, according to one embodiment.

FIG. 4 is a diagram of the components of the traffic prediction platform 107, according to one embodiment. By way of example, the traffic prediction platform 107 includes one or more components for providing semantic-free traffic prediction. It is contemplated that the functions of these components may be combined or performed by other components of equivalent functionality. In this embodiment, the traffic prediction platform 107 includes a data pre-processing module 401, a pattern extraction module 403, a clustering module 405, a tokenization module 407, a dictionary module 409, and a prediction module 411. The above presented modules and components of the traffic prediction platform 107 can be implemented in hardware, firmware, software, or a combination thereof. Though depicted as a separate entity in FIG. 1, it is contemplated that the traffic prediction platform 107 may be implemented as a module of any of the components of the system 100. In another embodiment, the traffic prediction platform 107 and/or one or more of the modules 401-411 may be implemented as a cloud based service, local service, native application, or combination thereof. The functions of the traffic prediction platform 107 and the modules 401-411 are discussed with respect to FIGS. 5-8 below.

Figure 5:
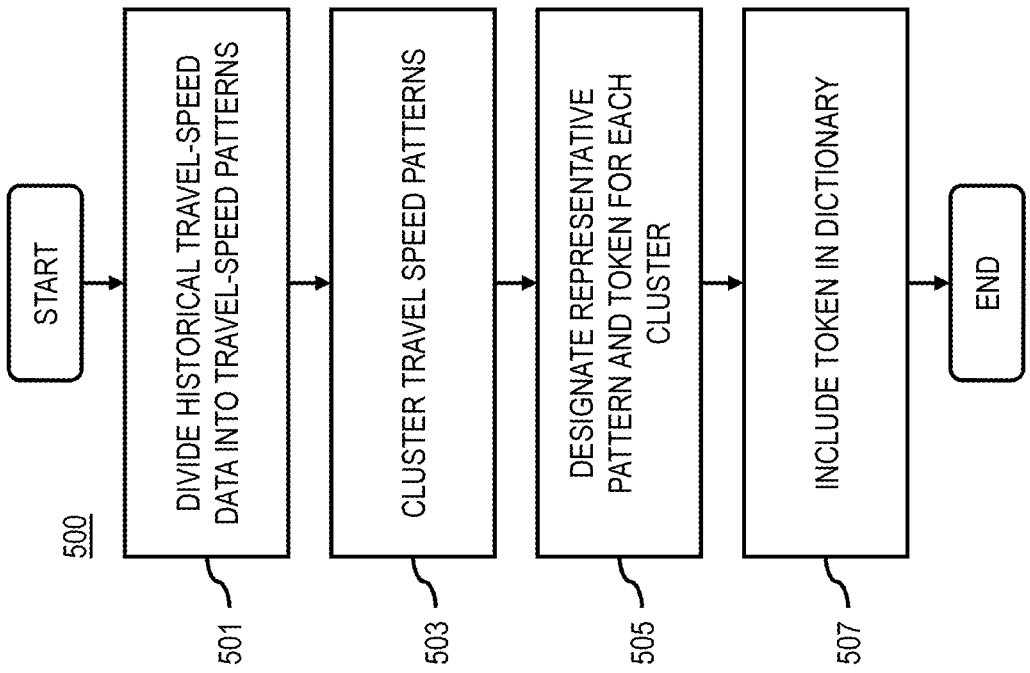
FIG. 5 is a flowchart of a process for creating a dictionary of tokens from historical travel-speed data, according to one embodiment.
Figure 10:
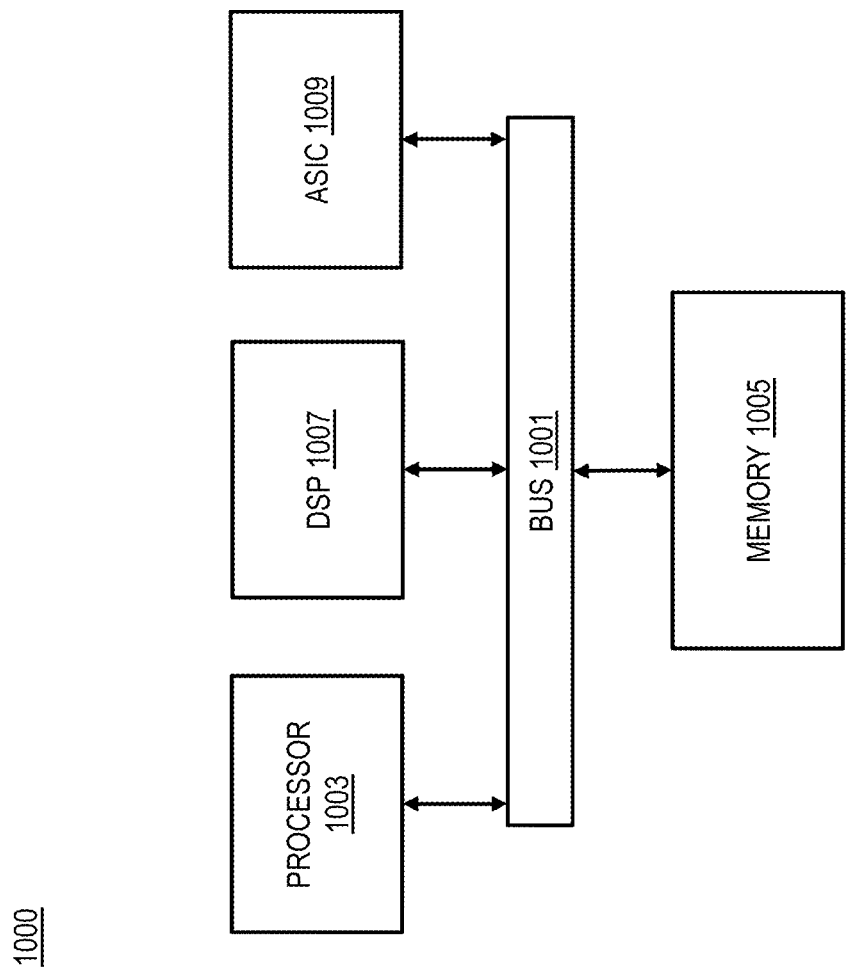
FIG. 10 is a diagram of a chip set that can be used to implement an embodiment of the invention.

FIG. 5 is a flowchart of a process for creating a dictionary of tokens from historical probe data, according to one embodiment. In various embodiments, the traffic prediction platform 107 and/or the modules 401-411 of the traffic prediction platform 107 as shown in FIG. 4 may perform one or more portions of the process 500 and may be implemented in, for instance, a chip set including a processor and a memory as shown in FIG. 10. As such, the traffic prediction platform 107 and/or the modules 401-411 can provide means for accomplishing various parts of the process 500, as well as means for accomplishing embodiments of other processes described herein in conjunction with other components of the system 100. Although the process 500 is illustrated and described as a sequence of steps, it is contemplated that various embodiments of the process 500 may be performed in any order or combination and need not include all of the illustrated steps.

In step 501, the pattern extraction module 403 divides historical travel-speed data into travel-speed patterns. As previously described, travel-speed data represent travel speeds of vehicles, devices, etc. traveling in a road network. By way of example, the travel-speed data can include, but is not limited to, probe data collected from one or more probes in the road network, or a from road speed sensors (e.g., inductive loops, cameras, etc.) operating in the road network to sensed travel speeds at various location in the road network. In one embodiment, the data pre-processing module 401 can optionally pre-process the probe data to facilitate pattern extraction. By way of example, the pre-processing steps can include smoothing the travel-speed data (e.g., travel speed data is typically reported as discrete points such as probe points) to get a continuous curve. In yet another embodiment, the pre-processing can include processing the travel-speed data to: (1) filter unrealistic speed and heading values (e.g., filter probe or data points with speeds that do not fall within an expected normal range [0 kph to 300 kph] and/or heading values between 0 and 360 degrees); (2) convert time values reported in travel-speed data to local time; (3) define time variables (e.g., year, day of week, hours, minutes, etc.); (3) compute trajectories from travel-speed data; (4) re-sample the travel-speed data to a regular frequency (e.g., 5-second frequency); (5) average the travel-speed data in fixed intervals (e.g., 15-minute intervals); (6) provide gap-filling for gaps in the probe data; (7) regularize the speed distribution of the travel-speed data by, e.g., truncating speed values to multiples of 5 or other value, and/or capping speeds above 99.9%; and/or (8) map-match the travel-speed data to specific links.

In one embodiment, following data pre-processing, if performed, the pattern extraction module 403 divides the historical travel-speed data. As previously described, the travel-speed data can be divided using any criterion or process. For example, in one embodiment, the travel-speed data can be divided at one or more points where a probe speed transitions from a free-flow value to a predetermined congestion value, or from the predetermined congestion value to the free-flow value. In another embodiment, the travel-speed data can be divided at fixed or arbitrary times of the day (e.g., at fixed hours). By dividing at transition points or at different times, each pattern can vary in length with respect to other patterns. For example, a long highway road link may have a travel-speed pattern (e.g., when there are no incidents) that spans several hours because traffic normally flows freely for long stretches without interruption (e.g., does not quickly change between free-flow and congestion). However, the same road link may show multiple and shorter travel patterns if there is an incident causing heavy congestion (e.g., free-flow to congestion and vice-versa occurs more often with stop and go traffic typical of congestion).

In one embodiment, the pattern extraction module 403 divides the travel-speed data by determining an average speed value of the travel-speed data stream. The travel-speed data stream is then divided at one or more points where a probe speed transition crosses (e.g., either speeds up to cross, or slows down to cross) the average speed value. In other embodiments, the transition from free-flow to congestion can be based on any other specified speed (e.g., a percentage of a speed limit for a given link, historical average, etc.). In addition or alternatively, the transition can be determined by evaluating a rate of change (e.g., acceleration or deceleration), whereby accelerating or decelerating beyond a threshold value can also be used to determine points at which to divide the probe data stream. It is further contemplated that any processes known in the art for detecting a speed transition from free-flow to congestion and vice-versa are applicable to the various embodiments described herein.

In step 503, the clustering module 405 clusters the extracted travel speed patterns. For example, the clustering module 405 can cluster by length and shape of the travel speed patterns, where patterns of similar shapes and lengths are grouped into one cluster. In one embodiment, the clustering module 405 can use k-means clustering or other equivalent clustering technique. For example, the k-means algorithm clusters the extracted travel speed patterns into a k number of clusters. Each extracted travel speed pattern belongs to a cluster with the nearest mean (e.g., mean shape and mean length) serving as a prototype of the cluster. In one embodiment, the clustering module 405 can use one or more criteria for determining the number of clusters. For example, these criteria include, but are not limited to: (1) a minimum percentage of samples; (2) a similar missing data percentage in each cluster; (3) an intra-cluster variance; and/or (4) not allowing zero speed. In one embodiment, the clustering (e.g., k-means clustering) is performed with gaps (e.g., no gap-filling) using only available data.

In one embodiment, the clustering module 405 can use machine learning to process the historical travel-speed data and determine the clusters of historical travel-speed patterns. In this way, other latent features (e.g., in addition or as alternates to shape and length) that are discovered by the machine learning can be used to create the cluster of travel patterns. Examples of machine learning techniques that can be used include, but are not limited to: decision tree learning, association rule learning, artificial neural networks, deep learning, support vector machines, Bayesian networks, and/or the like. In one embodiment, the clustering can also be performed in conjunction with binning of the travel patterns according to a time interval (e.g., binning to 15-minute intervals).

In yet another embodiment, the clustering module 405 can store cluster density information (e.g., the number of patterns grouped into a cluster). In one embodiment, the cluster density information can be used to determine traffic predictions. For example, a travel-speed pattern with greater cluster density may be given more weight when making a traffic prediction.

In step 505, the tokenization module 407 designates a representative or summary pattern and token for each cluster. In one embodiment, the representative or summary pattern is designated as a travel-speed template for the cluster and can be based on an average of the patterns in a cluster, selected from one of the patterns in the cluster (e.g., pattern closest to the mean), and/or any other suitable criteria. The tokenization module 407 then assigns a token to represent the cluster and/or associated travel-speed template. As previously discussed the token can be based on letters, numbers, symbols, etc., and/or any combination thereof. The examples described herein use individual letters as an example. In this case, sequences of the letters are analogous to words, and can be manipulated and/or processing using algorithms traditionally used for natural language processing, predicting a sequence (e.g., genome sequencing), etc.

In step 507, the dictionary module 409 includes the token in a dictionary. The dictionary, for instance, represents a compilation of all clustered patterns observed in a set of historical or training probe data. As previously discussed, the token dictionary and/or the clusters contained therein may have applicability to different granularities of a road network represented by the geographic database 109 (e.g., applicable to the entire network, a portion of the network, an individual link, or a subset of links—e.g., based on attributes of the links such as functional class, individual links, etc.).

Figure 6:
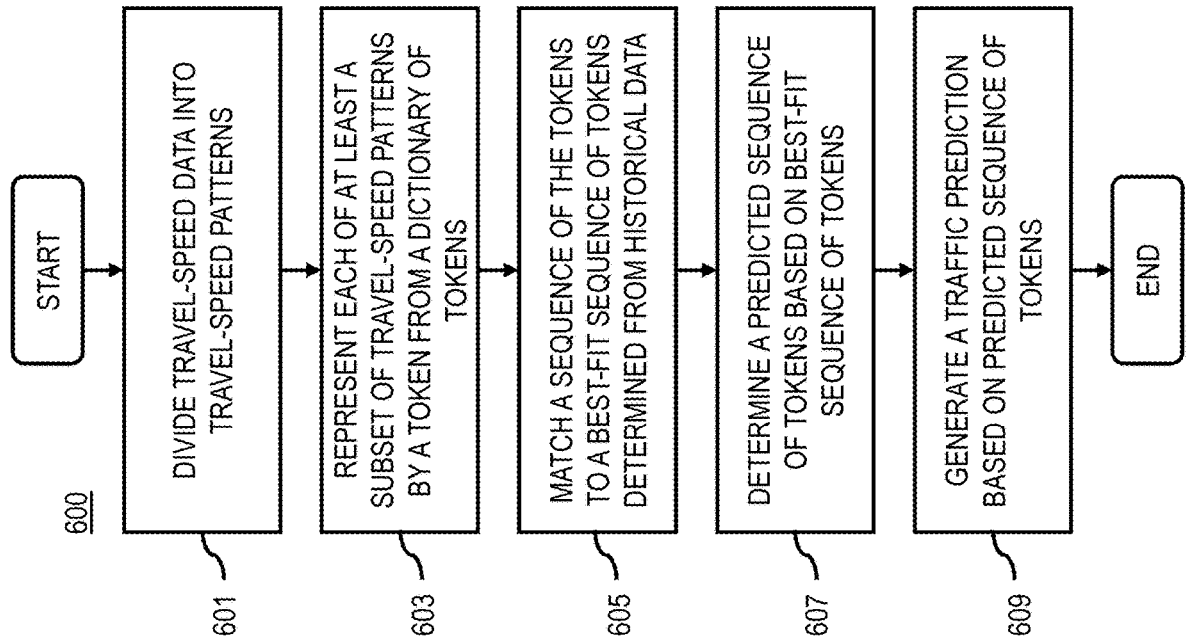
FIG. 6 is a flowchart of a process for providing semantic-free traffic prediction, according to one embodiment.

FIG. 6 is a flowchart of a process for providing semantic-free traffic prediction, according to one embodiment. In various embodiments, the traffic prediction platform 107 and/or the modules 401-411 of the traffic prediction platform 107 as shown in FIG. 4 may perform one or more portions of the process 600 and may be implemented in, for instance, a chip set including a processor and a memory as shown in FIG. 10. As such, the traffic prediction platform 107 and/or the modules 401-411 can provide means for accomplishing various parts of the process 600, as well as means for accomplishing embodiments of other processes described herein in conjunction with other components of the system 100. Although the process 600 is illustrated and described as a sequence of steps, it is contemplated that various embodiments of the process 600 may be performed in any order or combination and need not include all of the illustrated steps. In one embodiment, the process 600 is performed after a token dictionary is created as described with respect to the process 500 of FIG. 5.

In step 601, the pattern extraction module 403 divides a travel-speed data stream into a plurality of travel-speed patterns. The travel-speed data stream is collected from one or more probes traveling a road network or from road speed sensors operating in the road network, and serves as the data from which a traffic prediction is to be made. It is contemplated that the travel-speed data stream can be received for processing in real-time or as a batch process. As described with the respect to step 501 of FIG. 5, the pattern extraction module can pre-preprocess the probe data prior to dividing into travel patterns at determined speed transition points (e.g., points in time at which probe speed transitions from free-flow to congestion or vice-versa) or at fixed/arbitrary times. In one embodiment, as previously described, each of the resulting travel patterns each can have a respective fixed length. This fixed length, however, can vary between different patterns. The variable length enables different patterns to reflect phenomena or events that occur at different time scales. In some cases, different events of different time scales can potentially overlap in time, resulting in different and potentially overlapping patterns that correspond respectively to different phenomena.

In step 603, the tokenization module 407 represents each of the plurality of travel-speed patterns by a respective token. In one embodiment, the respective token is selected from a dictionary of tokens representing a plurality of travel-speed templates determined from historical probe data. In other words, the tokenization module 407 converts the travel-speed data into a sequence of tokens based on tokens matched from the dictionary. In one embodiment, the entire travel-speed data stream can be written in token form. Alternatively, the tokenization module 407 may write only a most recent interval of the travel-speed data in token form and then write additional previous intervals as needed for traffic prediction. For example, the most recent previous interval may be variable and span only a sufficient length of time to determine one (or another predetermined number) of tokens.

In step 605, the prediction module 411 matches a sequence of the respective tokens corresponding to said each of the plurality of travel-speed patterns to a best-fit sequence of tokens determined from the historical travel-speed data. In one embodiment, when processing historical travel-speed data to compile the token dictionary, the traffic prediction platform 107 may also identify and determine repeating or commonly occurring sequences of the historical tokens. The prediction module 411 can then use a method (e.g., a least-squares fit) to match the sequence of respective tokens from the current or observed probe data of interest against a best-fit sequence of the historical probe data.

In step 607, the prediction module 411 determines a predicted sequence of tokens based on the best-fit sequence of tokens. In other words, based on matching historical sequences to the observed sequence of tokens, the prediction module 411 can determine what token is predicted to occur next in the observed sequence of tokens. As previously discussed, the tokenization of the travel-speed data reduces the traffic prediction question to a determination of what token(s) are likely to occur next given a set of observed tokens. This prediction problem is analogous to problems in natural language processing where a prediction is made of what next word (e.g., sequence of tokenized travel-speed patterns) is likely to occur given a previous set of words. Similarly, other predictive algorithms used predicting sequences such as DNA or genome sequence, and/or other finite stochastic systems can be used to predict the next token in the observed sequence of tokens.

In step 609, the prediction module 411 generates a traffic prediction for the road network based on the predicted sequence of tokens. In one embodiment, to convert a predicted sequence of tokens into a traffic prediction, the prediction module 411 can query the token dictionary for the travel-speed templates that correspond to each of the predicted tokens and combine them in sequence to provide semantic-free traffic prediction. The speed curves in each of the corresponding travel-speed templates, for instance, predicts the expected speed of travel along a road link exhibiting the particular observed sequence of tokens used for the traffic prediction. Additional examples of the process for making the traffic prediction from tokenized probe data are described with respect to FIGS. 7 and 8 below.

Figure 7:
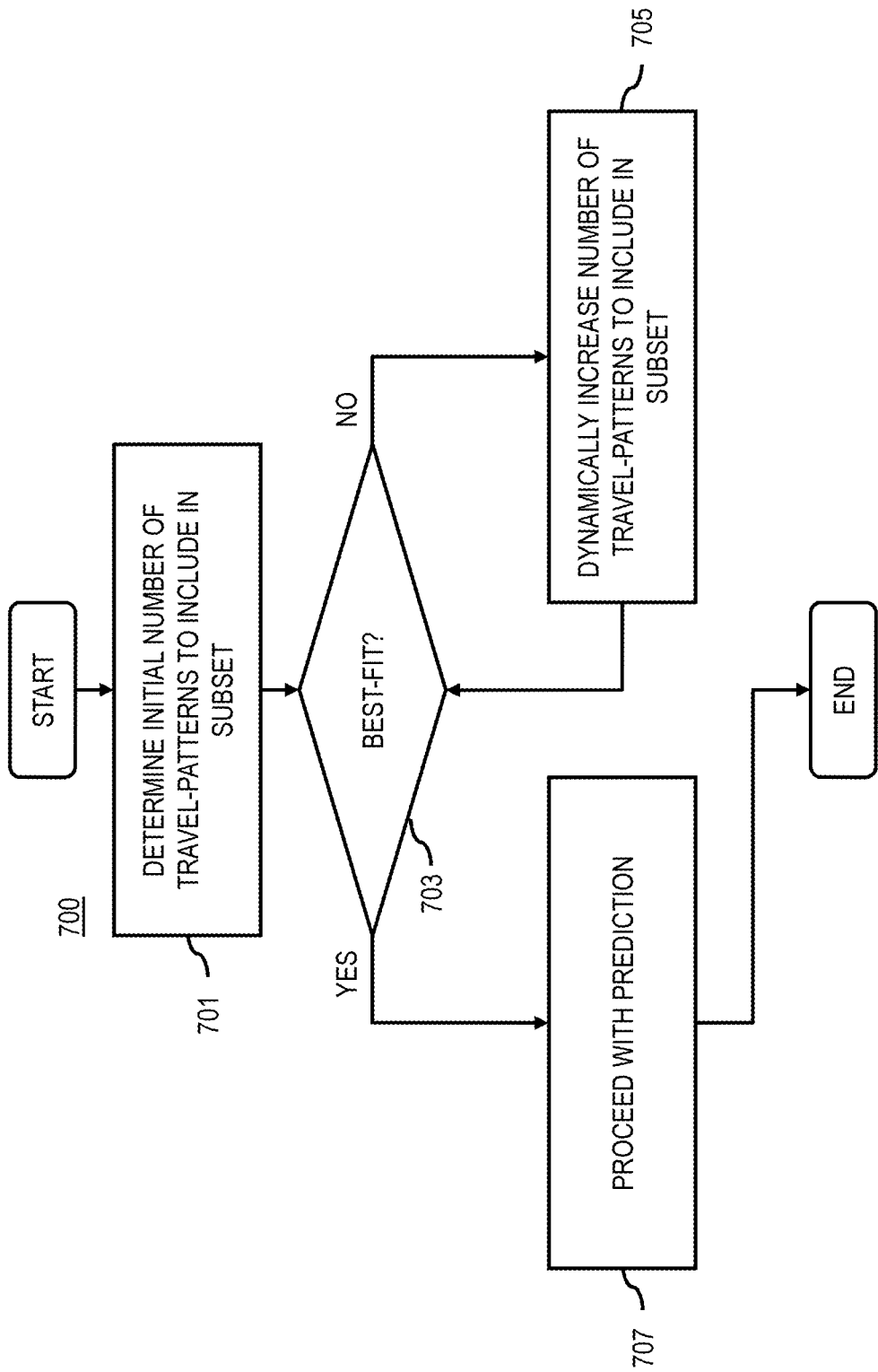
FIG. 7 is a flowchart of a process for dynamically increasing the number of travel-patterns to generate a traffic prediction, according to one embodiment.

FIG. 7 is a flowchart of a process for dynamically increasing the number of travel-patterns to generate a traffic prediction, according to one embodiment. In various embodiments, the traffic prediction platform 107 and/or the modules 401-411 of the traffic prediction platform 107 as shown in FIG. 4 may perform one or more portions of the process 700 and may be implemented in, for instance, a chip set including a processor and a memory as shown in FIG. 10. As such, the traffic prediction platform 107 and/or the modules 401-411 can provide means for accomplishing various parts of the process 700, as well as means for accomplishing embodiments of other processes described herein in conjunction with other components of the system 100. Although the process 700 is illustrated and described as a sequence of steps, it is contemplated that various embodiments of the process 700 may be performed in any order or combination and need not include all of the illustrated steps.

As previously described, in one embodiment, the system 100 uses a variable length of travel-speed data to make predictions. By way of example, the length or amount of previous travel-speed data varies depending on the number of patterns or tokens needed to make an unambiguous or unique traffic prediction and/or that meets one or more stopping criteria. As previously discussed, stopping criteria can define conditions other than uniqueness that can be used by the system 100 to determine the length of travel-speed data that is to be used to make a prediction. In yet another embodiment, the length of previous travel-speed data to evaluate can also depend on a requested period of time into the future for which the traffic prediction is to be made. Accordingly, in step 701, the prediction module 411 determines an initial number of travel-speed patterns to include in a subset of collected and processed probe data that are to be processed for generating a traffic prediction. In one embodiment, the initial number patterns or tokens to include in the subset can be as small as one token spanning minutes to hours (e.g., in the case of a highly unusual phenomenon or pattern) or extend to multiple tokens over days up to a week or more (e.g., in the case of distinguishing between traffic patterns of different weekdays—such as Tuesday vs Wednesday—when no semantic information is used to identify the day of week).

In step 703, the prediction module 411 determines whether the selected number or length of the subset results in an unambiguous best-fit of the subset to historical sequences of tokens, and/or whether one or more stopping criteria are met. For example, when determining the number or length based on uniqueness, the prediction module 411 can determine whether the current number or length of the subset will result in a prediction with multiple possible future traffic states. In one embodiment, possible future traffic states can be determined based on whether a future traffic state has a probability of occurring above a threshold value given the subset of observed patterns or tokens. In one embodiment, the probability of a possible traffic state can also be based at least partially on cluster density information for the corresponding travel-speed template (e.g., template corresponding to the token predicted to occur next). Similarly, when determining the number or length of the subset results to evaluate, the prediction module 411 can retrieve the applicable stopping criterion (e.g., a maximum number of tokens to include in the subset or sequence to match) for evaluation. The stopping criterion can specify that once the maximum or target number of tokens is reached, then prediction module 411 can proceed to find the best-fit sequence regardless of uniqueness.

If there is no unambiguous best-fit sequence of historical tokens or the stopping criterion has not been met (e.g., maximum or target number of tokens has not been reach using the current length), the prediction module 411 dynamically increases the number of the plurality of the travel-speed patterns to include in the subset until the determined best-fit sequence is unambiguous or the stopping criterion is met (step 705). For example, the number of tokens can be increased one by one, or by something other amount (e.g., 2 tokens, 3 tokens, etc.). In addition, the increase can be linear or accordingly to any other function (e.g., linear, exponential, etc.).

If there is an unambiguous best-fit sequence or the stopping criterion is met, the prediction module 411 proceeds with generating the traffic prediction (step 707). For example, in the case of a unique or unambiguous best-fit sequence, the prediction module 411 generates the traffic prediction by determining the travel-speed patterns or profiles corresponding to the tokens in the best-fit sequence. In the case of determining the length based on the stopping criterion, the prediction module 411 can determine whether the length or sequence of tokens at time the criterion is met results in more than one best-fit sequence. If there is only one best-fit sequence, the traffic prediction is generated based on the single best-fit sequence as described above. If there is more than one best-fit sequence, the prediction module 411 can use any algorithm or process to choose from among the multiple best-fit sequences, or apply an algorithm to average the multiple best-fit sequences to determine a prediction. For example, the algorithm can perform a weighted average of the multiple best-fit sequences. In one embodiment, the weighted averaging can be based on the cluster densities determined for each of the tokens in the multiple best-fit sequences.

Figure 8:
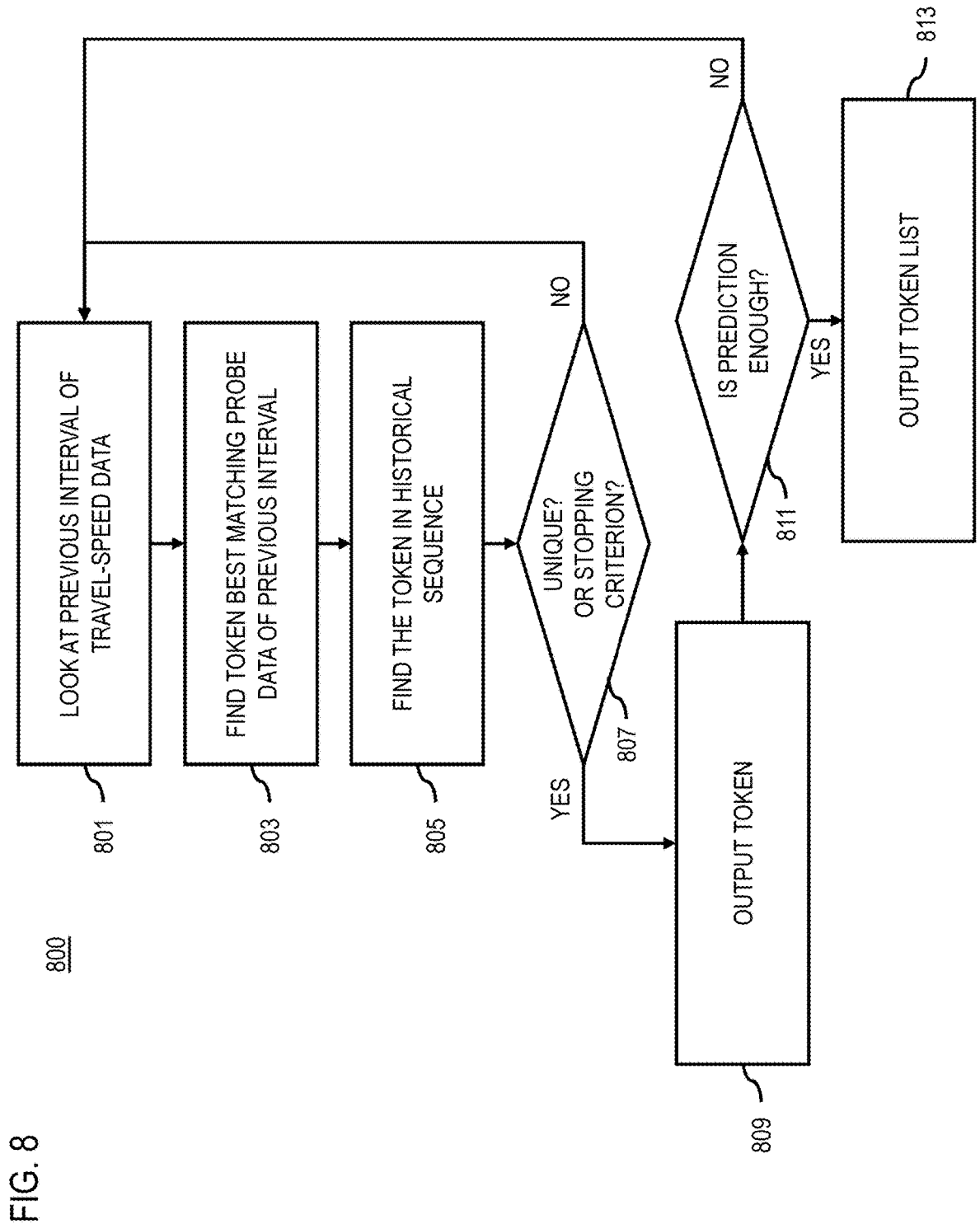
FIG. 8 is a flowchart of a process for determining a length of a previous interval of travel-speed data to evaluate based on a uniqueness and/or length of prediction, according to one embodiment.

FIG. 8 is a flowchart of a process for determining a length of a previous interval of probe data to evaluate based on a uniqueness, length of prediction, and/or other stopping criterion, according to one embodiment. In various embodiments, the traffic prediction platform 107 and/or the modules 401-411 of the traffic prediction platform 107 as shown in FIG. 4 may perform one or more portions of the process 800 and may be implemented in, for instance, a chip set including a processor and a memory as shown in FIG. 10. As such, the traffic prediction platform 107 and/or the modules 401- 411 can provide means for accomplishing various parts of the process 800, as well as means for accomplishing embodiments of other processes described herein in conjunction with other components of the system 100. Although the process 800 is illustrated and described as a sequence of steps, it is contemplated that various embodiments of the process 800 may be performed in any order or combination and need not include all of the illustrated steps.

The process 800 illustrates an example of the process 700 of FIG. 7 in which the length of the previous travel-speed to evaluate to provide a semantic-free traffic prediction is based on lookback intervals that span varying amounts of travel-speed data. In particular, the process 800 provides additional details on how the traffic prediction platform 107 can vary the previous intervals of data to use in order to provide a traffic prediction based on obtaining a unique prediction and/or other stopping criterion.

In step 801, the prediction module 411 looks at a previous interval of probe data to determine a travel-speed pattern. For example, the prediction module 411 retrieves probe data from a previous interval of time sufficient to identify at least one travel pattern. In one embodiment, the interval encompasses at least a partial travel pattern from which a complete travel-speed pattern can be determined or interpolated. Alternatively, the interval can be set so that it encompasses at least one complete travel-speed pattern, or based on the context. For example, the prediction module 411 can with the pattern extraction module 403 find a sufficient length of a previous interval of travel-speed data by detecting the speed transitions point or fixed/arbitrary times that define the boundaries of a travel pattern. As previously noted, because the patterns are highly context specific, the determined previous interval to use can vary from by link, day of week, time of day, incident, etc. However, such semantics are advantageously not needed by the prediction module 411 because the previous interval of interest is defined by the length of an extracted travel speed pattern.

In step 803, the prediction module 411 finds a token from an associated token dictionary that best matches the travel-speed data from the previous interval. In one embodiment, the prediction module 411 interacts with the tokenization module 407 to find a best fit (e.g., a least-squares fit) between the travel-speed pattern exhibited in the previous interval of interest against the travel-speed templates stored in the token dictionary. Once a matching travel-speed template is found in the dictionary, the token associated with the matching template is used to represent the pattern found in the previous interval of interest.

In step 805, the prediction module 411 finds the token in at least one previously determined historical sequence of tokens. For example, the prediction module 411 matches the token against a stored set of historical sequences (e.g., by determining whether that token appears in any of the historical sequences).

In step 807, the prediction module 411 determines whether the next token (e.g., a letter) in the matching historical sequence is unique or otherwise meets a stopping criterion (e.g., reaching an maximum or target number of tokens in the sequence). By way of example, the next token refers to the token in the historical sequence that occurs immediately following another token in the historical sequence that matches the token found in the previous interval. If the next token or letter is not unique or does not result in meeting the stopping criterion, the prediction module 411 returns to step 801. For example, the next token is not unique when a token of the previous interval (e.g., "a") appears in two possible historical sequences (e.g., "bat" and "cap"). In this case, the next token "t" or "p" are different and not unique or ambiguous. Accordingly, returning to step 801 enables the prediction module 411 to look at the next previous interval of travel-speed data to find the next previous token (step 803) to combine with earlier determined token into an observed sequence of tokens. Similarly, when evaluating against a stopping criterion that specifies a maximum or target number of tokens to include in the observed sequence of tokens, the prediction module 411 can determine whether the next token results in the current sequence reaching the maximum or target. If not, the prediction module 411 returns to step 803 to increase the number of tokens by finding the next previous token. In one embodiment, the uniqueness stopping criterion and the maximum/target token criterion can be used in combination or individually. The resulting observed sequence of tokens is then matched or found in another previously determined historical sequence of tokens to determine whether the next token in this newly matching historical sequence is unique and/or otherwise meets a stopping criterion (e.g., maximum or target number of tokens). This process can repeat recursively until a next unique token is determined. Continuing the example above, if the token "b" is observed in the next previous interval, the observed token list now becomes "ba". If "ba" matches only one historical sequence "bat", the next token is "t" and would be unique. In an example use case where a stopping criterion specifies that maxium number of tokens of 3, the process can also stop at "bat" even if "bat" were not unique because "bat" includes the maximum number of tokens.

If the next token (e.g., a letter) in the matching historical sequence token is unique and/or meets another applicable stopping criterion, then the prediction module 411 outputs the token to generate the traffic prediction (step 809). In the example above, the next token is "t". The prediction module 411 can determine the travel-speed template corresponding to this next token and output that as a semantic-free traffic prediction.

In step 811, the prediction module 411 determines whether the token output at step 809 will provide a traffic prediction that is enough to meet predetermined criteria. For example, the criteria might specify how far into the future a traffic prediction should be made (e.g., 30 mins, 1 hour, 2 hours, etc.). Accordingly, if the token output at step 809 does not correspond to a travel-speed template of a length that is enough to span the amount of time into the future that is to be predicted, the prediction module 411 can recursively return to step 801 until a sufficient number of predicted output tokens is achieved. This sequence of tokens can be compiled into a token list for the prediction module 411 to output for generating a traffic prediction once the prediction is determined to be enough (step 813).

The processes described herein for providing semantic-free traffic prediction may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
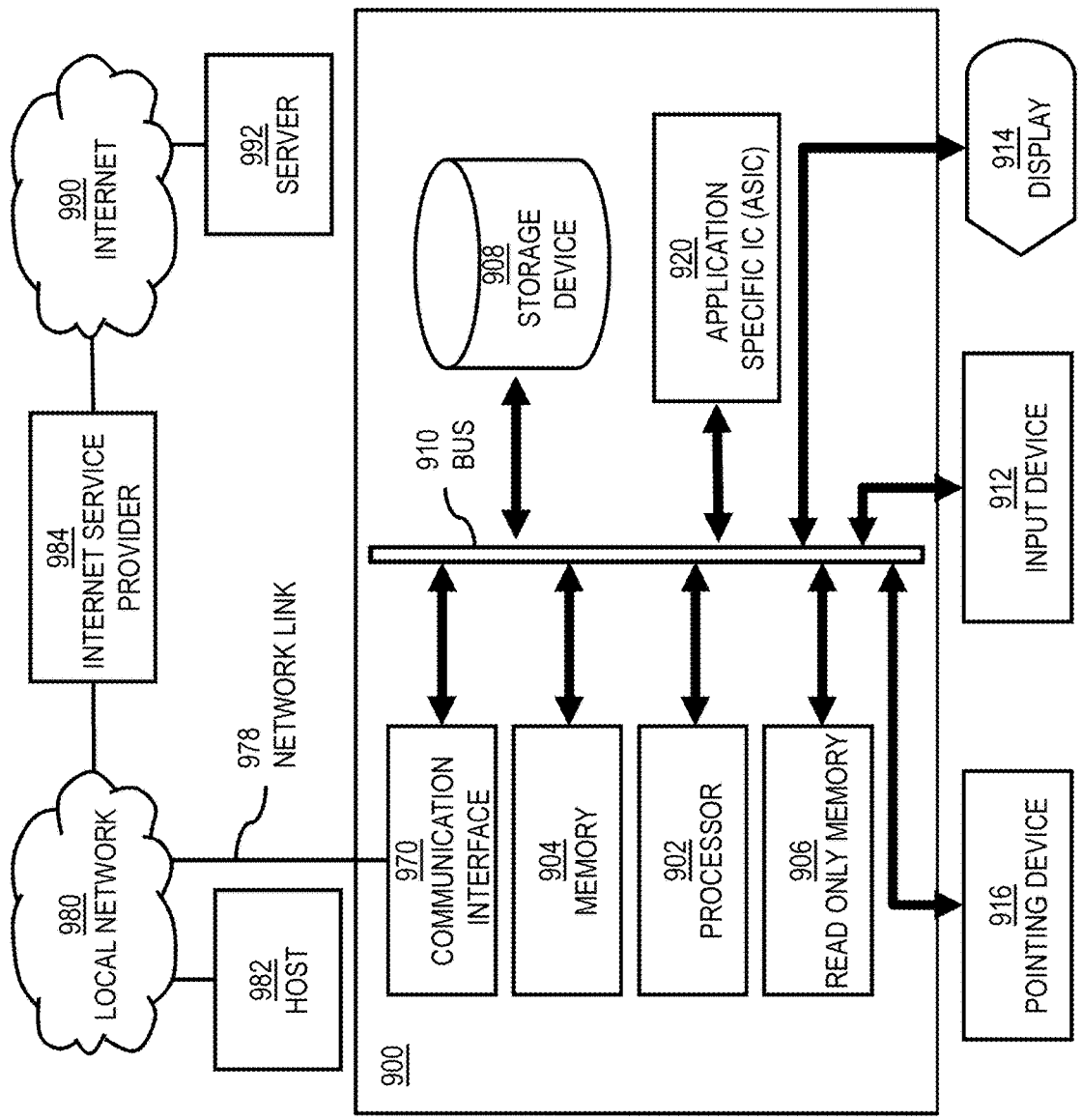
FIG. 9 is a diagram of hardware that can be used to implement an embodiment of the invention.

FIG. 9 illustrates a computer system 900 upon which an embodiment of the invention may be implemented. Computer system 900 is programmed (e.g., via computer program code or instructions) to provide semantic-free traffic prediction as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to providing semantic-free traffic prediction. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for providing semantic-free traffic prediction. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for providing semantic-free traffic prediction, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for providing semantic-free traffic prediction.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 10 illustrates a chip set 1000 upon which an embodiment of the invention may be implemented. Chip set 1000 is programmed to provide semantic-free traffic prediction as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to provide semantic-free traffic prediction. The memory 1005 also stores the data associated with or generated by the execution of the inventive steps.

Figure 11:
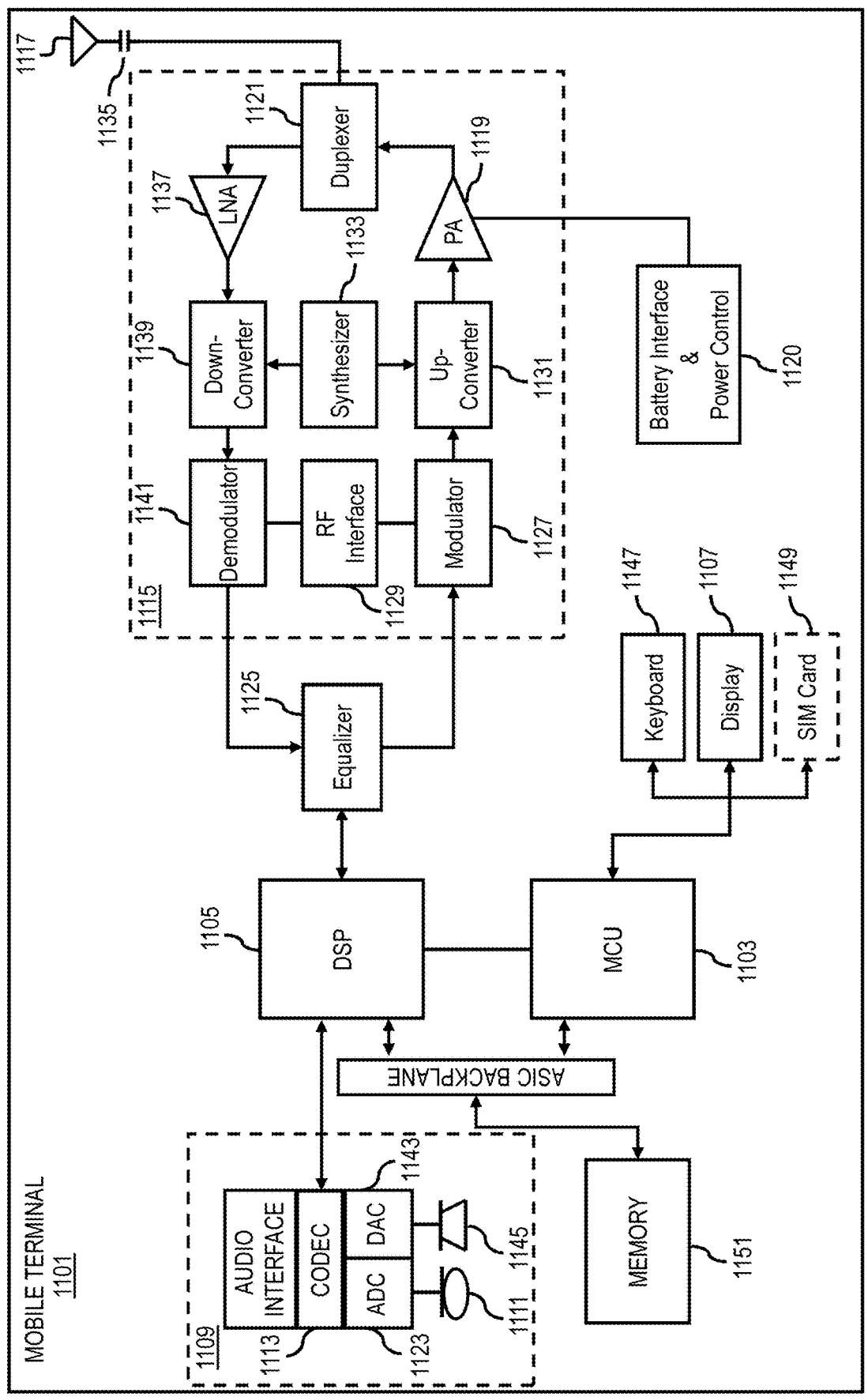
FIG. 11 is a diagram of a mobile terminal (e.g., handset) that can be used to implement an embodiment of the invention.

FIG. 11 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to provide semantic-free traffic prediction. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network.

The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for predicting traffic from travel-speed data using tokenized travel-speed patterns comprising:
   dividing a travel-speed data stream into a plurality of travel-speed patterns, wherein the travel-speed data stream represents vehicle travel speeds occurring in a road network;
   clustering the plurality of travel-speed patterns according to similar shapes and lengths;
   representing each of the clustered travel-speed patterns by a respective token, wherein the respective token is selected from a dictionary of tokens representing a plurality of travel-speed templates determined from historical travel-speed data;
   matching a sequence of the respective tokens corresponding to said each of the clustered travel-speed patterns to a best-fit sequence of tokens determined from the historical travel-speed data;
   determining a number of the plurality of travel-speed patterns to include in the sequence that is matched based on a stopping criterion that specifies a predetermined number of the tokens for prediction of future traffic;
   determining that the matched sequence is not unique or the stopping criterion is not met;
   dynamically increasing the number of the plurality of the travel-speed patterns to include in the sequence until the sequence is unique or the stopping criterion is met;
   determining a predicted sequence of tokens based on the best-fit sequence of tokens; and
   generating a traffic prediction for the road network based on the predicted sequence of tokens.

2. The method of claim 1, wherein the sequence that is matched further comprises:
   matching a predetermined number of a most recent of the plurality of the travel-speed patterns to the dictionary of tokens; and
   predicting a future traffic pattern that corresponds to the most recent of the plurality of the travel-speed patterns.

3. The method of claim 1, further comprising:
   processing, using machine learning, the historical travel-speed data to determine clusters of historical travel-speed patterns,
   wherein the plurality of travel-speed templates represented in the dictionary of tokens correspond to a respective summary of each of the determined clusters.

4. The method of claim 1, wherein the travel-speed data stream is a probe data stream collected from one or more probes traveling in the road network, a sensor data stream from one or more speed sensors operating in the road network, or a combination thereof.

5. The method of claim 1, wherein the travel-speed data stream is divided at one or more points at fixed times of day, at one or more arbitrary times of day, or a combination thereof.

6. The method of claim 1, wherein the travel-speed data stream is divided at one or more points where a travel speed transitions from a free-flow value to a predetermined congestion value, or from the predetermined congestion value to the free-flow value.

7. The method of claim 1, further comprising:
determining an average speed value of the travel-speed data stream,
wherein the travel-speed data stream is divided at one or more points where a probe speed crosses the average speed value.

8. The method of claim 1, further comprising:
determining one or more commonly occurring sequences of historical tokens from the dictionary of tokens; and
matching the sequence of the respective tokens to the commonly occurring sequences of the historical tokens.

9. The method of claim 8, further comprising:
determining a next token in the commonly occurring sequences of the historical tokens is not unique, wherein the next token is not unique if a token of a previous interval of the plurality of the travel-speed patterns results in two possible historical sequences; and
determining a next previous interval to find a next previous token to match with the occurring sequences of the historical tokens.

10. An apparatus for predicting traffic from travel-speed data using tokenized travel-speed patterns comprising:
at least one processor; and
at least one memory including computer program code for one or more programs,
the at least one memory and the computer program code configured to, with the at least one processor, cause the apparatus to perform at least the following,
divide a travel-speed data stream into a plurality of travel-speed patterns, wherein the travel-speed data stream represents vehicle travel speeds occurring in a road network;
cluster the plurality of travel-speed patterns according to similar shapes and lengths;
represent each of the clustered travel-speed patterns by a respective token, wherein the respective token is selected from a dictionary of tokens representing a plurality of travel-speed templates determined from historical travel-speed data;
match a sequence of the respective tokens corresponding to said each of the clustered travel-speed patterns to a best-fit sequence of tokens determined from the historical travel-speed data;
determine a number of the plurality of travel-speed patterns to include in the sequence that is matched based on a stopping criterion that specifies a predetermined number of the tokens for prediction of future traffic;
determine that the matched sequence is not unique or the stopping criterion is not met;
dynamically increase the number of the plurality of the travel-speed patterns to include in the sequence until the sequence is unique or the stopping criterion is met;
determine a predicted sequence of tokens based on the best-fit sequence of tokens; and
generate a traffic prediction for the road network based on the predicted sequence of tokens.

11. The apparatus of claim 10, wherein the sequence that is matched further comprises:
match a predetermined number of a most recent of the plurality of the travel-speed patterns to the dictionary of tokens; and
predicting a future traffic pattern that corresponds to the most recent of the plurality of the travel-speed patterns.

12. The apparatus of claim 10, wherein the apparatus is further caused to:
process, using machine learning, the historical travel-speed data to determine clusters of historical travel-speed patterns,
wherein the plurality of travel-speed templates represented in the dictionary of tokens correspond to a respective summary of each of the determined clusters.

13. The apparatus of claim 11, wherein the travel-speed data stream is a probe data stream collected from one or more probes traveling in the road network, a sensor data stream from one or more speed sensors operating in the road network, or a combination thereof.

14. The non-transitory computer-readable storage medium for predicting traffic from travel-speed data using tokenized travel-speed patterns, carrying one or more sequences of one or more instructions which, when executed by one or more processors, cause an apparatus to at least perform the following steps:
dividing a travel-speed data stream into a plurality of travel-speed patterns, wherein the travel-speed data stream represents vehicle travel speeds occurring in a road network;
representing each of at least a subset of the plurality of travel-speed patterns by a respective token, wherein the respective token is selected from a dictionary of tokens representing a plurality of travel-speed templates determined from historical travel-speed data;
matching a sequence of the respective tokens corresponding to said each of the subset of the plurality of travel-speed patterns to a best-fit sequence of tokens determined from the historical travel-speed data;
determining a number of the plurality of travel-speed patterns to include in the sequence that is matched based on a stopping criterion that specifies a predetermined number of the tokens for prediction of future traffic;
determining that the matched sequence is not unique or the stopping criterion is not met;
dynamically increasing the number of the plurality of the travel-speed patterns to include in the sequence until the sequence is unique or the stopping criterion is met;
determining a predicted sequence of tokens based on the best-fit sequence of tokens; and
generating a traffic prediction for the road network based on the predicted sequence of tokens.

15. The non-transitory computer-readable storage medium of claim 14, wherein the apparatus is further caused to perform:
clustering the plurality of travel-speed patterns according to similar shapes and lengths, wherein each of the subset of the plurality of travel-speed patterns, the plurality of travel-speed templates, the clustered travel-speed patterns, or a combination thereof represent travel speed versus time for a respective fixed length of time.

* * * * *